United States Patent
Wallerstein et al.

(10) Patent No.: US 10,397,064 B2
(45) Date of Patent: Aug. 27, 2019

(54) SYSTEM AND METHOD FOR CUSTOM GRAPH GENERATION

(71) Applicant: ServiceNow, Inc., Santa Clara, CA (US)

(72) Inventors: Roy Wallerstein, Kfar-Saba (IL); Haviv Rosh, Modiin (IL); Yuval Rimar, Petah Tikva (IL)

(73) Assignee: SERVICENOW, INC., Santa Clara, CA (US)

( * ) Notice: Subject to any disclaimer, the term of this patent is extended or adjusted under 35 U.S.C. 154(b) by 95 days.

(21) Appl. No.: 15/491,674

(22) Filed: Apr. 19, 2017

(65) Prior Publication Data
US 2017/0310552 A1 Oct. 26, 2017

Related U.S. Application Data

(60) Provisional application No. 62/325,277, filed on Apr. 20, 2016.

(51) Int. Cl.
*H04L 12/24* (2006.01)
*G06F 9/50* (2006.01)
*G06T 11/20* (2006.01)

(52) U.S. Cl.
CPC ............ *H04L 41/12* (2013.01); *G06F 9/505* (2013.01); *G06T 11/206* (2013.01); *H04L 41/22* (2013.01)

(58) Field of Classification Search
CPC ....... H04L 41/12; H04L 41/22; H04L 43/062; H04L 67/10; H04L 65/608; H04L 67/02; G06T 11/206; G06F 9/505
(Continued)

(56) References Cited

U.S. PATENT DOCUMENTS 5,450,480 A * 9/1995 Man ................ H04M 3/42144
                                                379/201.03
7,788,275 B2   8/2010 Warren et al.
(Continued)

OTHER PUBLICATIONS neo4j.com, "5.2. Traversal Framework Java API", Operations Manual, Developer Manual, OGM Manual, Java Reference, Rest Docs, Date Unknown, Downloaded Apr. 14, 2017, http://neo4j.com/docs/java-reference/current/#tutorial-traversal-java-api, 63 pp.
(Continued)

*Primary Examiner* — David R Lazaro
*Assistant Examiner* — Berhanu Shitayewoldetadik
(74) *Attorney, Agent, or Firm* — Fletcher Yoder PC

(57) ABSTRACT

A custom graph of nodes can be selectively generated based on a selected node in a graph representative of a network-connected computing infrastructure. The custom graph can, for example, be generated using software executing on a server device. The server device can receive an indication of the selected node from a client device. A plugin can then be invoked by providing the selected node to the plugin. Responsive to providing the selected node to the plugin, the plugin can provide output including child nodes generated by the plugin. The child nodes generated by the invocation of the plugin can be iteratively processed to generate the custom graph, such as by providing those child nodes to the plugin for subsequent invocation, as applicable. After the custom graph is generated, it can be transmitted to the client device from which the indication of the selected node was received. The custom graph may be displayed at the client device.

20 Claims, 10 Drawing Sheets

(58) Field of Classification Search
USPC .................................... 709/223, 225, 232
See application file for complete search history.

(56) References Cited

U.S. PATENT DOCUMENTS

| | | | | |
|---|---|---|---|---|
| 2005/0065797 | A1* | 3/2005 | Haenel | H04M 3/4938 704/270.1 |
| 2006/0184597 | A1* | 8/2006 | Yamashita | G06F 8/20 708/400 |
| 2006/0274070 | A1* | 12/2006 | Herman | A63F 13/10 345/474 |
| 2009/0240886 | A1* | 9/2009 | Sayfan | G06N 3/02 711/117 |
| 2010/0082646 | A1* | 4/2010 | Meek | G06F 17/3056 707/752 |
| 2011/0173264 | A1* | 7/2011 | Kelly | G06Q 10/10 709/205 |
| 2011/0238691 | A1 | 9/2011 | Gere et al. | |
| 2012/0066284 | A1* | 3/2012 | Archer | G06F 15/16 709/201 |
| 2013/0055092 | A1* | 2/2013 | Cannon, III | G06F 3/0484 715/738 |
| 2013/0159963 | A1* | 6/2013 | Dhalait | G06F 11/368 717/104 |
| 2013/0268325 | A1* | 10/2013 | Dembo | G06T 11/206 705/7.39 |
| 2014/0181160 | A1* | 6/2014 | Novak | G06F 17/30038 707/822 |
| 2014/0207860 | A1* | 7/2014 | Wang | H04L 65/403 709/204 |
| 2014/0306987 | A1* | 10/2014 | Snibbe | G06Q 50/01 345/619 |
| 2015/0264122 | A1* | 9/2015 | Shau | H04L 67/10 709/203 |
| 2017/0090876 | A1* | 3/2017 | Hale | G06F 16/2237 |
| 2017/0090877 | A1* | 3/2017 | Hale | G06F 8/433 |
| 2017/0090889 | A1* | 3/2017 | Hale | G06F 8/433 |
| 2017/0139680 | A1* | 5/2017 | Proctor | G06F 8/20 |

OTHER PUBLICATIONS slideshare.net, "Intro to Graph Databases Using Tinkerpop, TitanDB, and Gremlin", Caleb Jones, Data Software Engineer, Published on Apr. 1, 2014, Downloaded Apr. 14, 2017, https://www.slideshare.net/calebwjones/intro-to-graph-databases-using-tinkerpops-titandb-and-gremlin, 81 pp.

neo4j.com, "Interface Evaluator", Evaluator (Neo4j 3.1.4 API), Date Unknown, Downloaded Apr. 14, 2017, http://neo4j.com/docs/java-reference/current/javadocs/org/neo4j/graphdb/traversal/Evaluator.html, 2 pp.

stackoverflow.com, "Neo4j Using a Custom Evaluator to get the depth a node was retrieved at", Questions, Date Unknown, Downloaded Apr. 14, 2017, http://stackoverflow.com/questions/14481098/neo4j-using-a-custom-evaluator-to-get-the-depth-a-node-was-retrieved-at, 2 pp.

stackoverflow.com, "Using filters in traversal neo4j", Questions, Date Unknown, Downloaded Apr. 14, 2017, http://stackoverflow.com/questions/7800695/using-filters-in-traversal-neo4j, 2 pp.

* cited by examiner

SYSTEM AND METHOD FOR CUSTOM GRAPH GENERATION

CROSS REFERENCE TO RELATED APPLICATIONS

The present application claims the benefit of U.S. Provisional Application No. 62/325,277, filed Apr. 20, 2016, the entire contents of which are hereby incorporated by reference in the entirety.

TECHNICAL FIELD

The present disclosure relates in general to systems and techniques for custom graph generation.

BACKGROUND

Components of a network-connected computing infrastructure can be represented as nodes on a graph. Depending on the implementation such components can include physical components (e.g., a server or laptop), logical components (e.g., software modules or network-accessible functionality), or components representative of other attributes of the network-connected computing infrastructure. In some cases, the graph can be constructed from a Configuration Management Database (CMDB) that includes Configuration Items (CIs) representative of components of the network-connected computing infrastructure. The CIs of the CMDB can be populated, for example, by using a discovery process whereby information about the components in the network-connected computing infrastructure are collected by probes deployed through a network.

SUMMARY

Disclosed herein are aspects of systems and techniques for custom graph generation.

In an implementation, a system is provided that selectively generates a custom graph of nodes from a selected node in a graph representative of a network-connected computing infrastructure. The system comprises a processor and a memory. The memory includes instructions executable by the processor to receive an indication of the selected node from a client device. The memory further includes instructions executable by the processor to invoke a plugin, wherein the instructions to invoke the plugin includes instructions to provide the selected node to the plugin, wherein an output of the plugin includes child nodes generated by the plugin. The memory further includes instructions executable by the processor to iteratively process the child nodes generated by the invocation of the plugin and subsequent invocations of the plugin to generate the custom graph, wherein the child nodes generated by the plugin are provided to the plugin in subsequent invocations. The memory further includes instructions executable by the processor to transmit the generated custom graph to the client device for display.

In an implementation, a method is provided that selectively generates a custom graph of nodes from a selected node in a graph representative of a network-connected computing infrastructure. The method comprises receiving an indication of the selected node from a client device. The method further comprises invoking a plugin by providing the selected node to the plugin, wherein an output of the plugin includes child nodes generated by the plugin. The method further comprises iteratively processing the child nodes generated by invoking the plugin and subsequent invocations of the plugin to generate the custom graph, wherein the child nodes generated by the plugin are provided to the plugin in subsequent invocations. The method further comprises transmitting the generated custom graph to the client device for display.

In an implementation, a non-transitory computer-readable storage medium is provided. The non-transitory computer-readable storage medium comprises processor-executable routines that, when executed by a processor, facilitate a performance of operations. The operations comprise receiving an indication of a selected node in a graph representative of a network-connected computing infrastructure from a client device. The operations further comprise invoking a plugin by providing the selected node to the plugin, wherein an output of the plugin includes child nodes generated by the plugin. The operations further comprise iteratively processing the child nodes generated by the invocation of the plugin and subsequent invocations of the plugin to generate a custom graph, wherein the child nodes generated by the plugin are provided to the plugin in subsequent invocations. The operations further comprise transmitting the generated custom graph to the client device for display.

These and other aspects of the present disclosure are disclosed in the following detailed description of the embodiments, the appended claims and the accompanying figures.

BRIEF DESCRIPTION OF THE DRAWINGS

The description herein makes reference to the accompanying drawings wherein like reference numerals refer to like parts throughout the several views.

DETAILED DESCRIPTION

Figure 1:
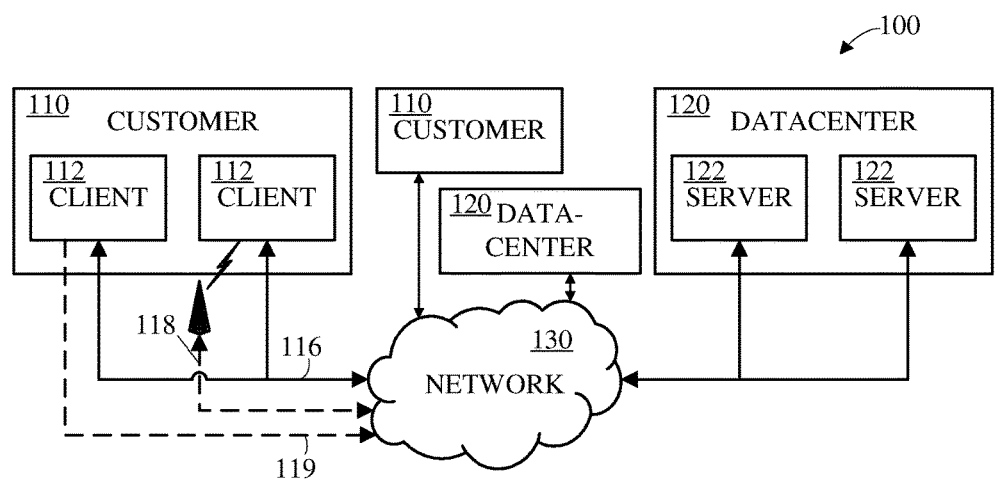
FIG. 1 is a block diagram of a distributed or cloud computing system.

Systems for managing a network-connected computing infrastructure can include graphical user interfaces capable of displaying graphs of nodes representative of components within the computing infrastructure. In larger organizations, the graphs displayed by such systems can become large and complex. An example of such a large and complex graph is depicted in a user interface 900 of FIG. 9. In such a display, the quantity of nodes and connections between nodes can render the display difficult to use for reasons including volume of information and information that may not be relevant given the context for which the display is being utilized by a user.

Thus, it may be desirable to generate a custom graph of nodes and connections such as to display more relevant nodes and/or connections. However, using a model-driven approach may not provide enough flexibility for optimizing the displayed graph. For example, a model-driven approach can be limited to a simplification of an existing graph by, e.g., hiding selected nodes or relationships already existing in the graph. It may be optimal to instead reorganize nodes and connections or add nodes or connections depending on the context in which the graphical display is being utilized. For example, it may be desirable to add connections not present but which are inferable or it may be desirable to add nodes not present but which can be determined. To accomplish this, a plugin architecture can be used that permits an extension of a graph traversal. It may also be advantageous to provide an interface for generating a custom graph that does not require handling of all tasks needed for graph generation, interaction with a graph traversal API, or a combination thereof. For example, a plugin architecture can be provided that does not require the plugin to handle, e.g., retrieving metadata, security, circular loops, and incorrect links.

In some implementations, a custom graph of nodes can be generated based on a selected root node. Depending on the implementation, the root node can be selected by the system, by a user input or a combination thereof. The root node can be included in the custom graph. A plugin module can be used to execute a plugin on the root node to generate child nodes that can be included in the custom graph along with the root node. The system can then iteratively execute the plugin against at least some of the generated child nodes, for example, until no more child nodes are generated. Alternatively, execution can stop after occurrence of other conditions, such as a depth of the custom graph. During processing of the custom graph, other operations can occur, such as processing of children and links, preparation of output, checking of permissions, and handling of floating CIs.

In some implementations, a system for custom graph generation is provided. Such a system can include a CMDB which can be populated, for example, using a discovery module. In some implementations, the discovery module can obtain information about components in a network-connected computing infrastructure using agent software executing within a customer environment. A graph generation module can generate a graph of nodes in the network-connected computing infrastructure from CIs stored within the CMDB. In some implementations, the graph generation module can be tied to a plugin module for the generation of custom graphs from graphs generated from the CMDB. Generated graphs can be output into a graphical user interface using a UI module and then, for example, transmitted to a client device for display on a display device. A plugin generation module can be provided that can provide an interface for the creation of plugins for use with the plugin module. In some implementations, the interface provided by the plugin generation module is accessible from a client device, where the interface can be displayed on a display device.

To describe some implementations in greater detail, reference is first made to examples of hardware structures and interconnections usable in implementations of the present disclosure. FIG. 1 is a block diagram of a distributed or cloud computing system 100. Use of the phrase "cloud computing system" herein is a proxy for other forms of a distributed computing system, and this phrase is used simply for ease of reference. The cloud computing system 100 can have a number of customers, including customers 110. Each customer 110 may have clients, such as clients 112. Each of the clients 112 can be in the form of a computing system including multiple computing devices, or in the form of a single computing device, for example, a mobile phone, a tablet computer, a laptop computer, a notebook computer, a desktop computer, and the like. The customers 110 and clients 112 are examples only, and a cloud computing system may have a different number of customers or clients or may have a different configuration of customers or clients. For example, there may be hundreds or thousands of customers and each customer may have a number of clients.

The cloud computing system 100 can include a number of datacenters, including a datacenter 120. Each datacenter 120 may have servers, such as servers 122. Each datacenter 120 may represent a facility in a different geographic location where servers are located. Each of the servers 122 can be in the form of a computing system including multiple computing devices, or in the form of a single computing device, for example, a desktop computer, a server computer, a virtual machine and the like. The datacenter 120 and the servers 122 are examples only, and a cloud computing system may have a different number of datacenters and servers or may have a different configuration of datacenters and servers. For example, there may be tens of datacenters and each datacenter may have hundreds or a number of servers.

The clients 112 and servers 122 may be configured to connect to a network 130. The clients for a particular customer may connect to the network 130 via a common connection point 116 or different connection points, e.g. a wireless connection point 118 and a wired connection point 119. A combination of common or different connections points may be present, and a combination of wired and wireless connection points may be present as well. Network 130 can be, for example, the Internet. Network 130 can also be or include a local area network (LAN), wide area network (WAN), virtual private network (VPN), or other means of transferring data between the clients 112 and the servers 122. The network 130, datacenter 120 and/or blocks not shown may include network hardware such as routers, switches, load balancers and/or other network devices.

Other implementations of the cloud computing system 100 are also possible. For example, devices other than the clients and servers shown may be included in the system 100. In an implementation, one or more additional servers may operate as a cloud infrastructure control, from which servers and/or clients of the cloud infrastructure are monitored, controlled and/or configured. For example, some or all of the techniques described herein may operate on said cloud infrastructure control servers. Alternatively, or in addition, some or all of the techniques described herein may operate on servers such as the servers 122.

Figure 2:
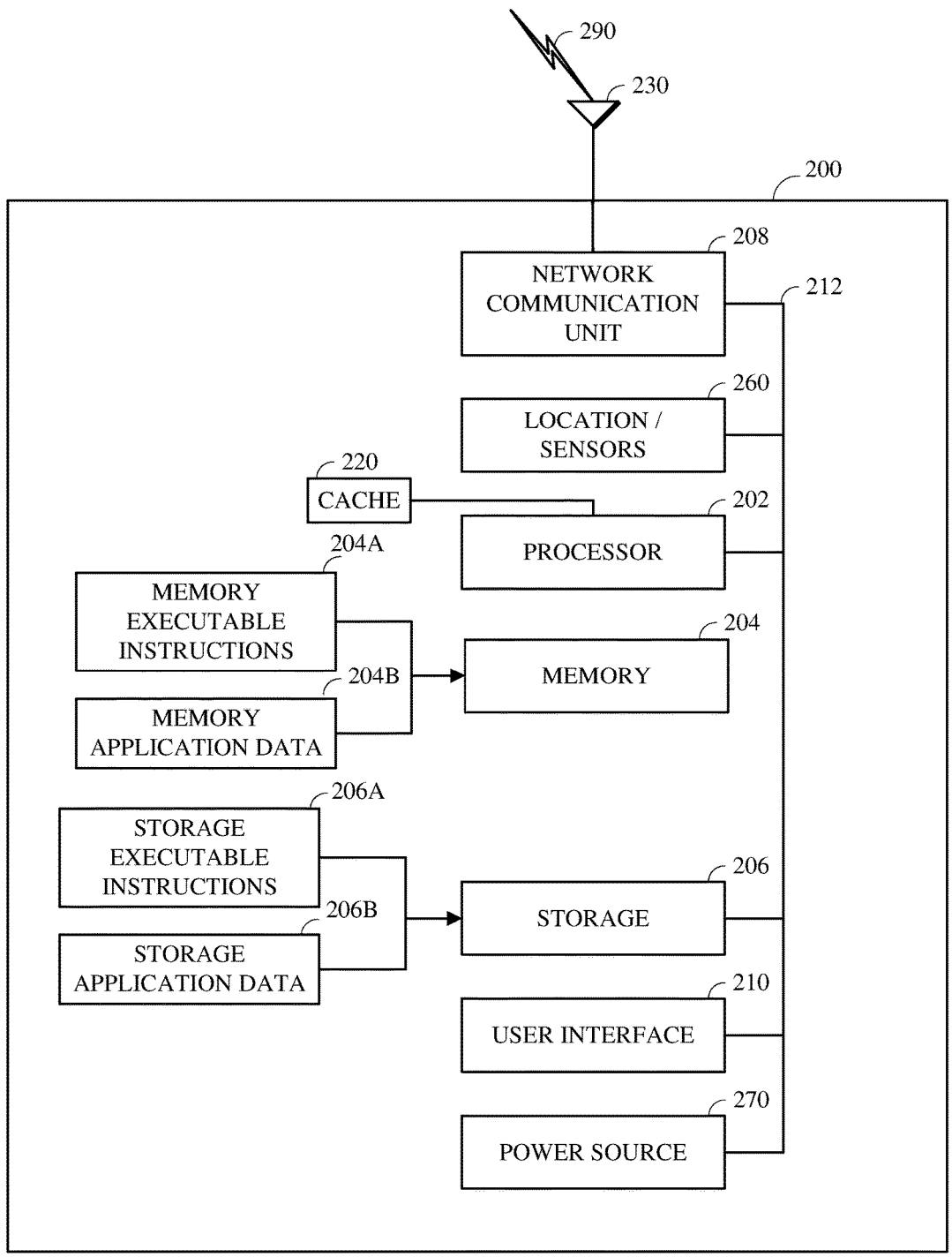
FIG. 2 is a block diagram of an implementation of an internal configuration of a computing device, such as a computing device of the computing system as shown in FIG. 1.

FIG. 2 is a block diagram of an implementation of an internal configuration of a computing device 200, such as a computing device (e.g., a client 112 or server device 122) of the computing system 100 as shown in FIG. 1. As previously described, the clients 112 or the servers 122 of FIG. 1 may take the form of a computing device 200 including multiple computing units, or in the form of a single computing unit, for example, a mobile phone, a tablet computer, a laptop computer, a notebook computer, a desktop computer, a server computer and the like.

The computing device 200 can include a number of components, as illustrated in FIG. 2. A processor 202 can be a central processing unit, such as a microprocessor, and can include single or multiple processors, each having single or multiple processing cores. Alternatively, the processor 202 can include another type of device, or multiple devices, capable of manipulating or processing information now-existing or hereafter developed. When multiple processing devices are present, they may be interconnected in various manners, including hardwired or networked, including wirelessly networked. Thus, the operations of the processor 202 can be distributed across multiple machines that can be coupled directly or across a local area or other network. The processor 202 can be a general purpose processor or a special purpose processor.

A memory 204 can be a suitable non-permanent storage device that is used as memory, for example, Random Access Memory (RAM). The memory 204 can include executable instructions and data for access by the processor 202. The memory 204 may comprise one or more DRAM modules such as DDR SDRAM. Alternatively, the memory 204 can include another type of device, or multiple devices, capable of storing data for processing by the processor 202 now-existing or hereafter developed. The processor 202 can access and manipulate data in the memory 204 via a bus 212. The processor 202 may utilize a cache 220 as a form of localized fast memory for operating on data and instructions.

A storage 206 can be in the form of read only memory (ROM), a disk drive, a solid state drive, flash memory, Phase-Change Memory (PCM), or another form of non-volatile memory designed to maintain data for some duration of time, and preferably in the event of a power loss. The storage 206 can include executable instructions 206A and application files/data 206B along with other data. The executable instructions 206A can include, for example, an operating system and one or more application programs for loading in whole or part into the memory 204 (with RAM-based executable instructions 204A and application files/data 204B) and to be executed by the processor 202. The executable instructions 206A may be organized into programmable modules or algorithms, functional programs, codes, and code segments designed to perform various functions described herein. The operating system can be, for example, a Microsoft Windows®, Mac OS X®, or Linux® operating system; an operating system for a small device, such as a smart phone or tablet device; or an operation system for a large device, such as a mainframe computer. The application program can include, for example, a web browser, web server and/or database server. The application files 206B can, for example, include user files, database catalogs and configuration information. The storage 206 may comprise one or multiple devices and may utilize one or more types of storage, such as solid state or magnetic.

The computing device 200 can also include one or more input/output devices, such as a network communication unit 208 and an interface 230 that may have a wired communication component or a wireless communications component 290, which can be coupled to the processor 202 via the bus 212. The network communication unit 208 can utilize one or more of a variety of standardized network protocols, such as Ethernet, TCP/IP, or the like to effect communications between devices. The interface 230 can comprise one or more transceiver(s) that utilize the Ethernet, power line communication (PLC), WiFi, infrared, GPRS/GSM, CDMA, or the like.

A user interface 210 can include a display, positional input device (such as a mouse, touchpad, touchscreen, or the like), keyboard, or other forms of user input and output devices. The user interface 210 can be coupled to the processor 202 via the bus 212. Other output devices that permit a user to program or otherwise use the client or server can be provided in addition to or as an alternative to the user interface 210. When the output device is or includes a display, the display can be implemented in various ways, including by a liquid crystal display (LCD), a cathode-ray tube (CRT), or a light emitting diode (LED) display (e.g., an OLED display).

Other implementations of the internal configuration or architecture of clients and servers are also possible. For example, servers may omit a display as the user interface 210. The memory 204 or the storage 206 can be distributed across multiple machines such as network-based memory or memory in multiple machines performing the operations of clients or servers. Although depicted here as a single bus, the bus 212 can be composed of multiple buses, that may be connected to each other through various bridges, controllers, and/or adapters. The computing device 200 may contain a number of sensors and detectors that monitor the computing device 200 itself or the environment around the computing device 200, such as sensors comprising a location identification unit 260, such as a GPS or other type of location device. The computing device 200 may also contain a power source 270, such as a battery, so that the unit can operate in a self-contained manner. These may communicate with the processor 202 via the bus 212.

Figure 3:
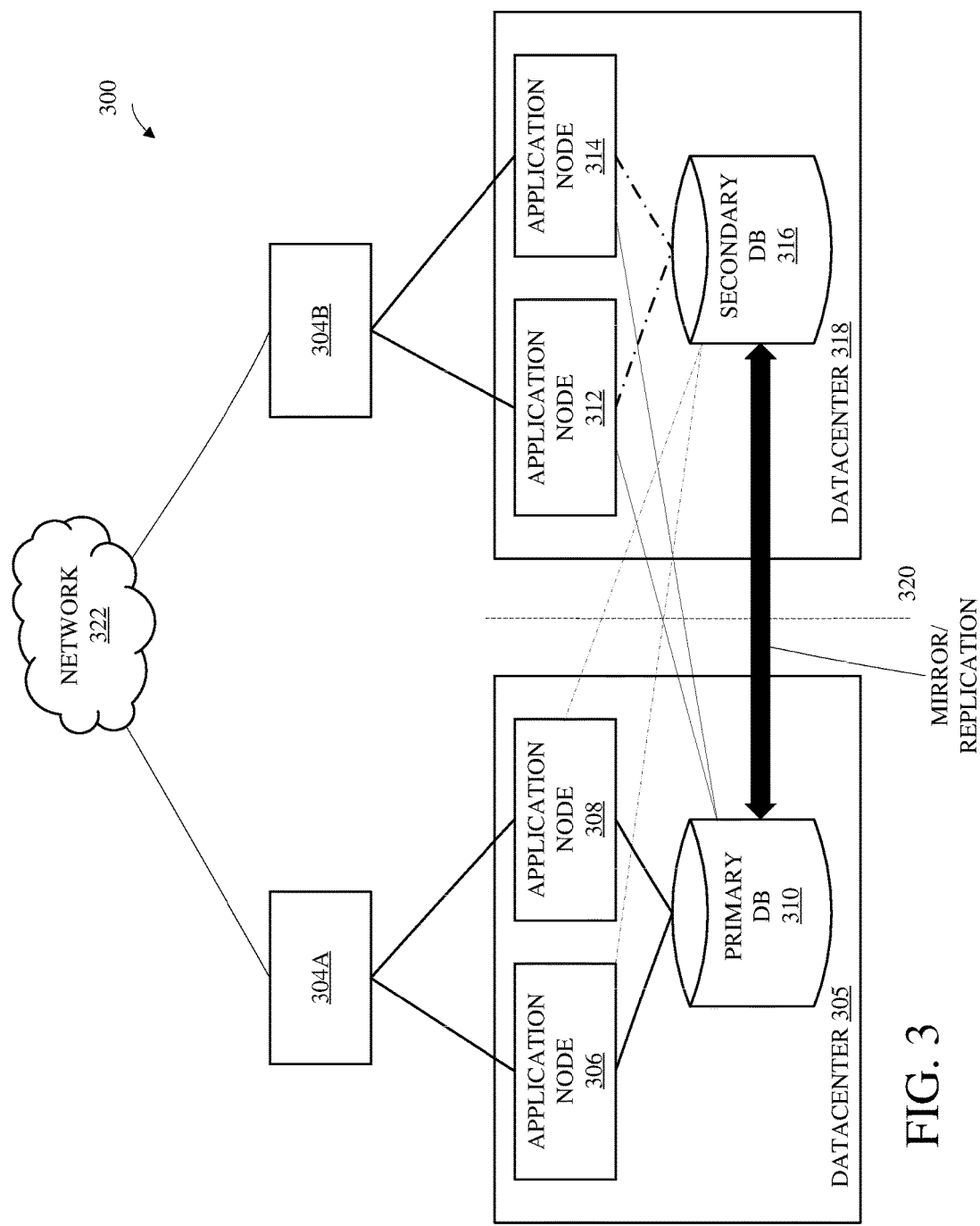
FIG. 3 is a block diagram of an implementation of a high availability processing system.

FIG. 3 is a block diagram of an implementation of a high availability processing system 300. The illustrated system 300 can be, for example, an implementation of datacenter 120 and network 130 of FIG. 1. Broadly, the system 300 includes load balancers 304A-304B and two datacenters 305, 318. The load balancers 304A-304B are coupled to a telecommunications network graphically depicted by network 130. The load balancers 304A-304B may also include reverse proxy load balancers.

The datacenter 305 includes a primary database 310, and the datacenter 318 includes a secondary database 316. The datacenters 305, 318 operate in such a manner that the secondary database 316 can provide an exact or substantially exact mirror of the primary database 310. A line 320 is used to graphically emphasize the logical boundary between the datacenters 305 and 318. Depending upon the intended application, the databases 310, 316 may be implemented using, for example, a relational database management system (RDBMS), an object database, an XML database, flat files, or the like.

Each datacenter 305, 318 can include two application nodes 306, 308, 312, 314, although a greater or lesser number can be used depending on the implementation. The application nodes can be implemented using processing threads, virtual machine instantiations, or other computing features of the datacenters that run programs on behalf of remotely sited clients, and exchange related data with such clients via a network 322 (e.g., the network 130 of FIG. 1). In connection with running these programs, occasions arise for the application nodes 306, 308, 312, 314 to store and retrieve data, with the databases 310 and 316 filling this role. In some implementations, each of the application nodes 306, 308, 312, 314 connects to a single primary database, such as the primary database 310, regardless of whether said database is located in the same datacenter as said application node. For example, the primary database 310 may be read/write and the secondary database 316 may be configured to be read-only such that it mirrors changes from the primary database 310. Requests to the system 300 may be routed to the application nodes 306, 308 in the datacenter 305 of the primary database 310 first, followed by the other datacenter 318. In a failover situation, the secondary database 316 may become read/write with the formerly primary database 310 switched to mirror the secondary database 316 (which becomes the primary database). In this situation, each application node 306, 308, 312, 314 can be reconfigured to point to the secondary database 316 (now the primary database) as shown by the dashed lines.

As mentioned above, each datacenter 305, 318 may have its own load balancer 304A-304B. Each load balancer 304A-304B may be configured to direct traffic to respective servers and processing nodes located within its datacenter. In regard to proxy services, in one example the load balancers 304A-304B are configured to provide a single Internet-delivered service to remote clients via the network 130, where this service is actually provided by a server farm composed of the computerized servers of the datacenters 305, 318. The load balancers 304A-304B also coordinate requests from remote clients to the datacenters 305, 318, simplifying client access by masking the internal configuration of the datacenters. The load balancers 304A-304B may serve these functions by directing clients to processing nodes as configured directly or via DNS. The load balancer 304A-304B can be configured for sticky sessions. With sticky sessions, requests from a client can be forwarded to the same application node 306, 308. 312, 314 for the duration of the client session.

In regard to load balancing, the load balancers 304A-304B can be configured to direct traffic to the secondary datacenter 318 in the event the primary datacenter 305 experiences one of many enumerated conditions predefined as failure. The load balancing functionality of the load balancers 304A-304B can be provided as separate components or as a single component.

Figure 4:
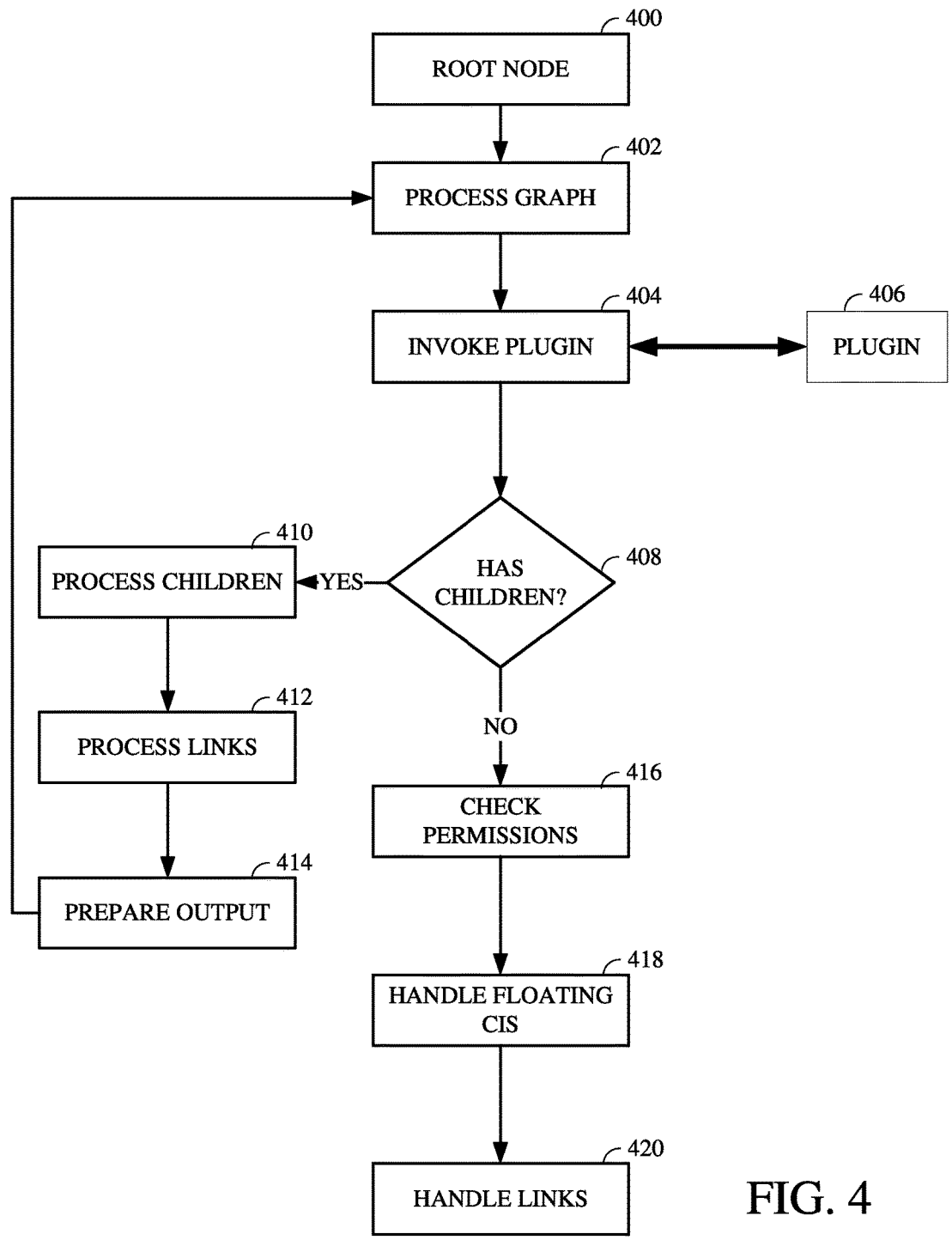
FIG. 4 is a flowchart of operational steps used in an implementation of custom graph generation.

Reference is now made to FIGS. 4-10 to further describe implementations of systems and techniques for custom graph generation. FIG. 4 is a flowchart of operational steps used in an implementation of custom graph generation. At step 400, a root node is selected from a graph of nodes of components in a network-connected infrastructure. The technique used to select the root node can vary depending on the implementation. For example, the root node can be selected by a user by way of a user interface or by the system. If selected by the system, for example, the root node can be identified as the node at the top of the graph or a node closest to an entry point in a contextual discovery process. In another example, the root node is not selected by the user or the system and is instead pre-selected or otherwise provided to the custom graph generation process. In yet another example, the selected node is not from a graph of nodes of components in a network-connected infrastructure and is instead selected in some other manner, such as by selecting a CI from the CMDB from which a graph of nodes could be generated.

A selected root node is provided as input to process step 402. Alternatively, output from step 414 (e.g., child nodes generated by prior plugin invocations) as described later can also be provided as input to step 402. At step 402, certain pre-processing steps can be completed before invocation of a plugin used to generate child nodes in the custom graph. For example, step 402 can include checking against defined limits and identifying the plugin to be invoked and/or input parameters for the plugin to be invoked. The defined limits can include limits on a number of nodes per graph, a hierarchy depth, and a number of nodes per level. The number of nodes per graph and level can be limited, for example, to manage usability and performance. For example, a number of nodes per level might also be limited to permit a user to more easily filter nodes per level. A maximum depth of the hierarchy can be set to prevent perpetual plugin invocation such as in a situation where a plugin might create a circular graph of nodes.

The identifying of a plugin at step 402 can include receiving an indication of a selected plugin from a client device, where the selected plugin is identified in a drop down user interface element in a user interface displayed on a display device by the client device. An exemplary implementation of such a user interface is further described with respect to FIG. 9. Step 402 can also determine input parameters to the selected plugin, such as the current depth level, an identifier of the root or parent node, and recursive parameters from prior iterations of plugin execution. No additional processing of input parameters may be needed by step 402. For example, the parameters can be retrieved from memory or other storage device so that they can be provided to the invoked plugin. Alternatively, step 402 can determine or process one or more parameters. For example, step 402 can be configured to traverse the custom graph to determine a current depth level. In some implementations, step 402 can be configured to automatically advance and maintain the current graph level.

Once step 402 is complete, a plugin 406 is invoked by invoke plugin step 404. Invoking the plugin 406 at step 402 can include providing the selected node to the plugin 406, such as based on the indication of the selected plugin from the client device. The plugin 406 can, for example, be one of many plugins available for custom graph generation, such as described later with respect to FIG. 5. The plugin invocation step 404 and the plugin 406 can be configured such that node traversal and retrieval operations are separated from identification of child nodes for inclusion in the custom graph. For example, the plugin 406 can be simplified as the requirements for the plugin 406 can be limited to child node identification.

The plugin 406 can, for example, be written in an interpreted scripting language such as JavaScript. For example, plugin invocation can include executing a JavaScript interpreter that processes the plugin text into computer readable instructions that are executed by a processor. The JavaScript interpreter can, for example, be connected to platform software executing on a Java Virtual Machine to enable the plugin to access functionality and data accessible via the platform software. For example, an instance of platform software can be implemented using one or more application nodes (e.g., the application nodes 306, 308 of FIG. 3) and one or more database nodes including a database (e.g., the database 310 of FIG. 3) Exemplary plugins are described further later in this disclosure. The output of step 404 can include one or more identifiers of child nodes generated by the plugin 406. Depending on the implementation, other output can be generated. For example, the output can include a unique identifier for a relation between the input node and a child node, a link type, a label of a link, a direction of a link, parameters for later invocations of the plugin, notification(s), or a combination thereof. Other output data can also be provided by step 404, including, for example, output data specific to one or more plugins. In some implementations, however, plugin 406 can be capable of producing no child nodes as output, and thus no output may be generated by the plugin 406 and step 404 (e.g., an empty array of data). Plugins can be configured to define links for child nodes, to not define links, or a combination thereof. For example, a link can be defined by a plugin by providing as output a link identifier. The link can be generated automatically, such as when a plugin does not define the link for a child node or when the link is expected (e.g., between a child and a parent), but is not defined by a plugin. Implementations of plugins described in Computer Program Listings 1-5 below include plugins that explicitly define links (e.g., Computer Program Listing 1) and that do not explicitly define links (e.g., Computer Program Listings 2-4).

After plugin invocation, control can be passed to step 408 which can determine whether the output from the plugin 406 includes generated children nodes. If the output includes children nodes, control passes to step 410 to iteratively process the generated children node(s). Step 410 can include checking permissions, verifying correctness, fetching data and metadata or a combination thereof. In some implementations, step 410 can include other processing of the generated child nodes.

Checking permissions can include verifying compliance with an access control framework which can, for example, govern access to information relating to CIs within a CMDB. For example, certain access control lists (ACLs) can indicate whether a user, or a role can access attributes of a given CI or associated page(s) or table(s). In this context, the operation of custom graph generation described in FIG. 4 can be carried out in the context of a given user or role. The operation can include checking an access control list for a CI associated with a current child node against the given user or role. If the operation is carried out in the context of a user that does not have permission to access a given CI identified as a child by plugin 406, according to, e.g., one or more ACLs, action can be taken to comply with the ACL(s). For example, such a CI can be removed as a child node in the custom graph and subsequent plugin invocations will not operate on the CI. In another example, such a CI can be processed by subsequent plugin invocations but information about the CI can be withheld from being included on a display of the custom graph. For example, a placeholder for the CI can instead be displayed or links including the CI can be reconfigured to bypass or omit the CI (e.g., links from node A to node B and node B to nodes C and D might be reconfigured to links from node A to nodes C and D).

Verifying correctness can include comparing the child nodes generated by the plugin 406 against criteria for valid graphs. For example, verifying correctness can include identifying child nodes that would result in a custom graph that includes a link between a node and itself, a circular or infinite loop, node duplication, non-existent nodes, or a combination thereof. For example, a verification of non-existent nodes might detect a node that does not meet valid graph criteria (e.g., because the node does not have an associated CI record). If a node is found that does not meet the criteria, it can be removed from the generated child nodes. Alternatively, or in addition, an error message can be displayed or custom graph generation can be halted, depending on the implementation.

Fetching data and metadata can include performing a database query or queries to obtain information relating to a generated child node. For example, the output of plugin 406 can include a database identifier of the child node but not attribute data about the child node. The plugin 406 can be configured to not provide such information so as to, for example, simplify creation of plugins such as plugin 406. In another example, the child node can be a cluster or group of nodes or CIs and the retrieved data can include information about the group or cluster. The retrieved data can include CI attributes for a CI for which the node is representative. The retrieved data can include some or all of the types of data described in Table 1, below.

TABLE 1

Exemplary data structure including information provided by an implementation of fetching data or metadata

```
{
    "name": "SampleDevice",
    "id": "fec416ed5bf2c2003c958cb43e425489",
    "className": "cmdb_ci_sample",
    "nodeId": 0,
    "manufacturerName": "",
    "classLabel": "Sample CI Type",
    "locationId": "",
    "locationName": "",
    "locationCity": "",
    "manufacturerId": "",
    "isCluster": false,
    "cidetail":
"/cmdb_ci_sample.do?sys_id=fec416ed5bf2c2003c958cb43e425489&-sysp arm_domain_restore=false",
    "auditFailures": [ ],
    "level": 1,
    "isCollapsed": false
}
```

After step 410, links relating to child nodes generated by plugin 406 can be processed in step 412. Step 412 processing considers only child nodes that survive step 410 (e.g. omitting child nodes removed by step 410). In some implementations of step 412, the type of links can be set, correctness can be verified, data and metadata can be fetched, or combinations thereof. For example, the type of link can be set based on, for example, CI relationships between the parent and child node or the type of nodes. In another example, correctness of links can be determined by checking if the link exists in the CMDB, checking if the link connects a node to itself, checking that the nodes to which a link connects exist, or a combination thereof. Data can be fetched for the link from the CMDB, such as information about the type of link or the name of the link. Step 412 can include other processing. For example, a number of links per parent node can be limited. Once that limit is reached, remaining links can be removed, a message can be displayed, custom graph processing can be halted, or a combination thereof. Links to a collapsed grouping can also be adjusted. For example, a link to a group can be removed and replaced with links to the group's constituent nodes or vice versa. In some implementations, a direction of a link can be set, such as from data from the CMDB. In some implementations, a tooltip for the link can be set, such as from a label or name associated with the link.

After step 412, the output to be processed by step 402 and passed to subsequent invocations of step 404 is prepared in step 414. In step 414, output can be aggregated, link directionality can be handled, grouping can be addressed, or a combination thereof. The output aggregation can include aggregating nodes into a single node representation. For example, five related nodes might be replaced or associated with a single node in the custom graph. For example, the output aggregation can include aggregating nodes that are in a cluster into a cluster group container node, aggregating nodes into a virtual type group container if a limit is reached for display of a particular type is reached, or a combination thereof. In another example, the output aggregation can include merged graphs that might have become separated from the custom graph (e.g., by the removal of nodes in one or more steps) into the custom graph.

In some implementations, link directionality can determine the flow of the graph. For example, a default link direction is downstream where parent nodes point towards their child nodes. However, links can be added in a direction other than the default. For example, a link from a child to a parent can be created. In some implementations, a check can be made to prevent creation of duplicate links between nodes that have a same direction, a check can be made to avoid exceeding a maximum links limit to be displayed per node, or a combination thereof.

In some implementations, grouping can be addressed by, for example, evaluating the generated child nodes to determine if they should be converted into a virtual group. Child nodes can be grouped because, for example, they are nodes in a cluster, such as a web server cluster. Grouping can be addressed by, for example, checking whether a node is within a collapsed group (e.g., a collapsed group can be its own node on the graph). For example, such a node can be skipped or removed from the custom graph.

After step 414, control passes to step 402 after which the child nodes remaining after steps 410, 412, 414 are processed and later provided to plugin 406.

Returning to step 408, if the output of invoke plugin step 404 and plugin 406 results in no child nodes being generated, control will pass to step 416 to check permissions. The process of step 416 can be the same or similar to the process described with respect to checking permissions in step 410. Step 416 can, for example, include traversing the generated custom graph to verify that all ACLs or other security or permissions restrictions have been complied with. In some implementations, step 416 can be omitted where permissions are comprehensively checked in earlier steps.

After step 416, control passes to step 418 to handle floating CIs or nodes. For example, various of the earlier processing steps might introduce a node or CI without links to other nodes. This could occur, for example, due to the removal of a link or node due to limits, permissions, or the like. Floating CIs can, for example, be removed from the custom graph, linked to nodes of the custom graph, left in the custom graph, or a combination thereof.

After step 418, control passes to step 420 to handle links between CIs or nodes. Step 420 can address links that e.g., point to nodes no longer in the custom graph due to e.g., their removal in prior steps such as steps 414, 416 or 418. Such links that point to nodes no longer in the graph can be removed. For example, links pointing to a node that has been aggregated, such as described above with respect to step 412, can be removed, modified to point to the aggregated node, or a combination thereof. If a link relates back to a link in the CMDB, metadata about the link can be retrieved at this step. A link tooltip can also be set.

A custom graph can be generated by iteratively processing the child nodes generated by the invocation of the plugin 406 at step 404 and subsequent invocations of the plugin 406 at step 404 (e.g., by repeating step 402 where children nodes are generated by the invocation of the plugin 406 at step 404). For example, the child nodes generated by the plugin can be provided to the plugin 406 in the subsequent invocations of the step 404. After completion of custom graph generation such as by using the steps described in FIG. 4, the custom graph can be transmitted to a client device for display. For example, the custom graph can be incorporated into a user interface for display on a client device such as by using a display device. The user interface can be generated by a server, for example, and then transmitted to the client device for display. In some implementations, iteratively processing the nodes to generate the custom graph can include recursively processing the nodes.

The steps described for custom graph generation with respect to FIG. 4 encompass certain implementations of custom graph generation. Other implementations are possible. For example, steps described in FIG. 4 can be combined with other steps, modified, or omitted. Other steps can be added. In some implementations, steps 410, 412, and 414 can be combined into one step or module. In some implementations, the processing of step 412, for example, can begin in parallel with processing of step 410 after one child node has been processed by step 410. Other improvements with respect to performance and parallel processing of steps are also contemplated.

In some implementations, a maximum graph depth can be set, such as to a value of 3. A user interface feature can be provided to permit a user to expand the maximum permitted graph depth in proximity to a selected node. For example, the user interface feature can include upon a right click on a node, providing a context menu with an option to further expand the graph from that node. In some implementations, the custom graph can be merged into the graph from which it is created. For example, a user interface element can be provided to permit the triggering of an asynchronous request for a selected node (e.g., using an AJAX call) to retrieve a custom graph for the selected node. Such a custom graph can be generated using a process similar to FIG. 4 but may, for example, omit steps relating to the grouping of nodes.

In some implementations, a user interface element can be provided to permit a user to expand or collapse groups within, e.g., an original graph or a custom graph created from the original graph. In some implementations, an original graph can be modified by a user in that some nodes of the original graph are expanded or collapsed as compared to a default or original state. The state of the expanded and collapsed nodes can be maintained and used in, e.g., the context of steps of FIG. 4 to aggregate, group, or ungroup nodes included within the custom graph such as in a manner consistent with the state of the original graph.

Figure 5:
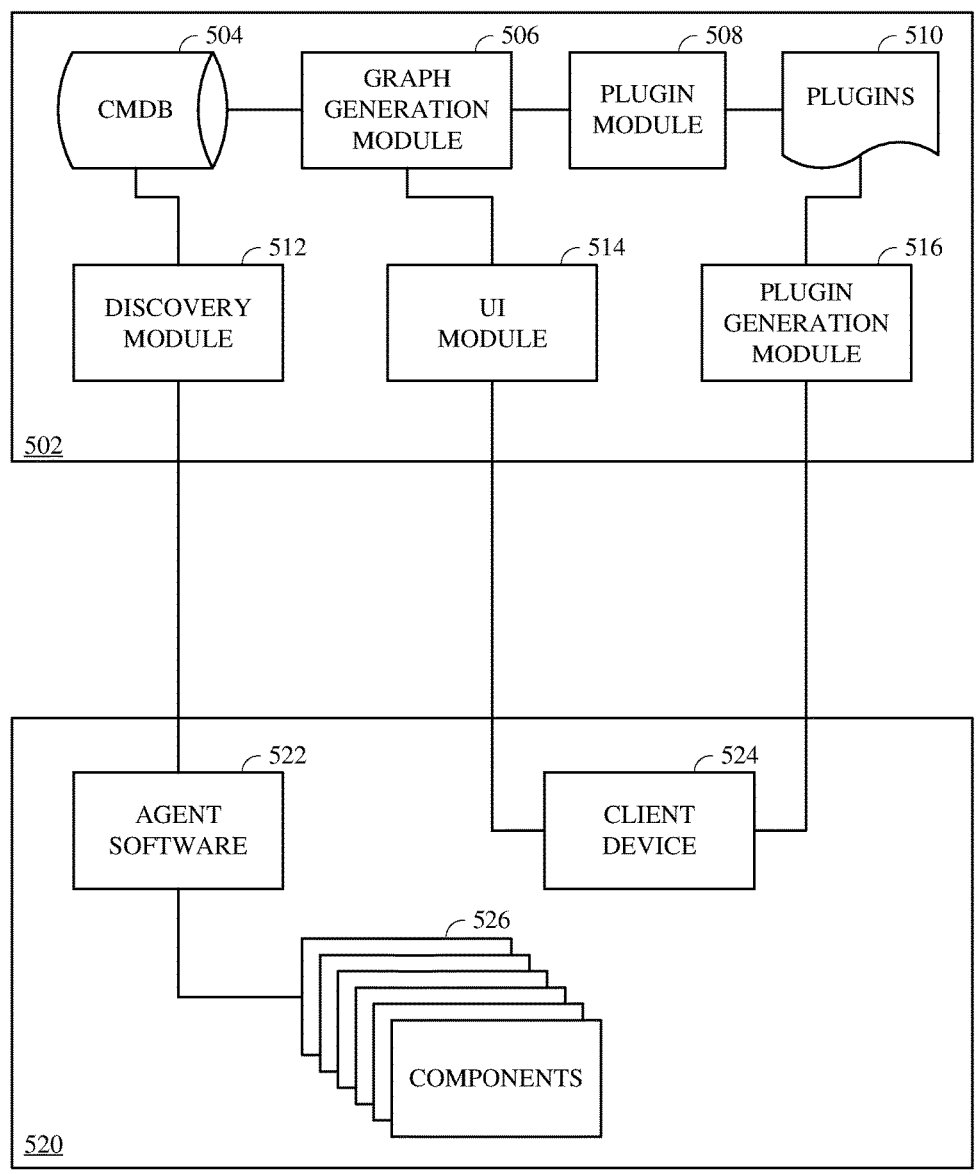
FIG. 5 is a block diagram of an implementation of a system for custom graph generation.

FIG. 5 is a block diagram of an implementation of a system for custom graph generation. The system includes a service provider environment 502 and a customer environment 520. The service provider environment 502 can include a CMDB 504, a graph generation module 506, a plugin module 508, plugins 510, a discovery module 512, a UI module 514, a plugin generation module 516, or a combination thereof. The service provider environment 502 can be implemented, for example, using the datacenter 120 and servers 122 of FIG. 1, the computing device 200 of FIG. 2, the system 300 of FIG. 3, or a combination thereof.

The customer environment 520 can include agent software 522, a client device 524, components 526, or a combination thereof. The customer environment 520 can be implemented, for example, using the customer 110 of FIG. 1. The agent software 522, client device 524, and components 526 can be implemented, for example, using the client 112 of FIG. 1, the computing device 200 of FIG. 2, or a combination thereof. The customer environment 520 is or includes a network-connected computing infrastructure which includes the components 526. The components 526 can include network-connected computing devices, such as but not limited to those described above with respect to FIG. 2 or below with respect to FIG. 6. The components 526 can include software modules, firmware, or other components installed on or executing within network-connected device components. The agent software 522 can include functionality for permitting communications between the service provider environment 502 and the customer environment 520, such as to control the performance of operations against the components 526. The agent software 522 may, for example, be implemented using MID server software provided by ServiceNow, Inc. of Santa Clara, Calif.

The customer environment 520 can be in communication with service provider environment 502 such as by way of a network. Such a network can be a WAN, LAN, point-to-point link, or another network link capable of permitting communication between network interfaces of devices within the customer environment 520 with network interfaces of devices within the service provider environment 502.

The service provider environment 502 can be an on-premises software installation. In such an implementation, the service provider environment 502 can be within or in close communication with the customer environment and/or can be more controlled by the customer for which the customer environment 520 is associated. In some implementations, the service provider environment 502 is administered by a third party service provider. The service provider environment 502 can be implemented using an instance of application software and database schema and records within a single-tenant hosted environment. For example, the service provider environment 502 can include an instance of platform software implemented using one or more application nodes and database nodes.

The CMDB 504 can include records of CIs and relationships between CIs. Information within the CMDB 504 can be populated using, for example, a discovery process. The discovery module 512 can perform the discovery process in conjunction with the agent software 522. The discovery module 512 can cause the agent software 522 to send probes into the network-connected computing infrastructure of the customer environment 520 to identify network-connected devices and to collect information about network-connected devices in a network-connected computing infrastructure, such as attributes of the devices and software modules executing on or installed on said devices. The information returned by the probe can be processed, e.g., by a sensor operating on the agent software 522, by the discovery module 512, or a combination thereof. The processed information can be used to update the CMDB 504. For example, CIs representative of the network-connected devices discovered using the discovery module 512 can be stored in the CMDB 504. The discovery process can, for example, be a horizontal discovery process whereby all devices within a particular scope, segment, subset, or range are discovered, or a contextual discovery process whereby devices and software are iteratively discovered starting from an entry point to a service provided to the discovery process.

The graph generation module 506 can be used to generate a graph based on data stored in the CMDB 504. For example, starting from an identified CI, the graph generation module 506 can generate a graph of nodes and links representative of CIs and CI relationships stored within or associated with the CMDB 504. For example, the CIs generated based on results of a discovery process can include relationships with other CIs in the CMDB. The graph generated by the graph generation module 506 can be constrained by graph generation parameters that may restrict, for example, the depth of the graph or number or type of nodes on the graph. The output graph of the graph generation module 506 can, for example, be output to the UI module 514 which can generate a graphical user interface for displaying a graphical representation of graphs produced by e.g., the graph generation module 506. Such graphical user interfaces can be transmitted to e.g., the client device 524 for display to a user on a display unit.

The graph generation module 506 can be in communication with the plugin module 508 which can be used to apply the plugins 510 to a node in a graph to generate a custom graph. For example, the graph generation module 506 can be configured to implement a custom graph generation process such as described above with respect to FIG. 4. In such an implementation, plugin invocation step 404 of FIG. 4 can include invoking a plugin 406 from the plugins 510 using plugin module 508.

The plugins 510 can be created using the plugin generation module 516. The plugin generation module 516 can include providing an interface displayable on the client device 524 for creating plugins, such as the user interface depicted in FIG. 10.

The system depicted in FIG. 5 is exemplary of certain implementations of systems for custom graph generation. Other implementations are available that, for example, combine, modify, omit, or add modules, components or devices. For example, the discovery module 512 can be omitted from an implementation or other modules can be provided for updating the CMDB 504, such as a data import module. For example, the agent software 522 can be omitted or additional agent software 522 can be added. For example, additional components and links between components other than shown by the components 526 can be added. For example, the plugin generation module 516 can be omitted and plugins can be provided by the service provider. For example, separate graph generation modules 506 can be provided for custom graph processing and for creating graphs directly from the CMDB 504.

Figure 6:
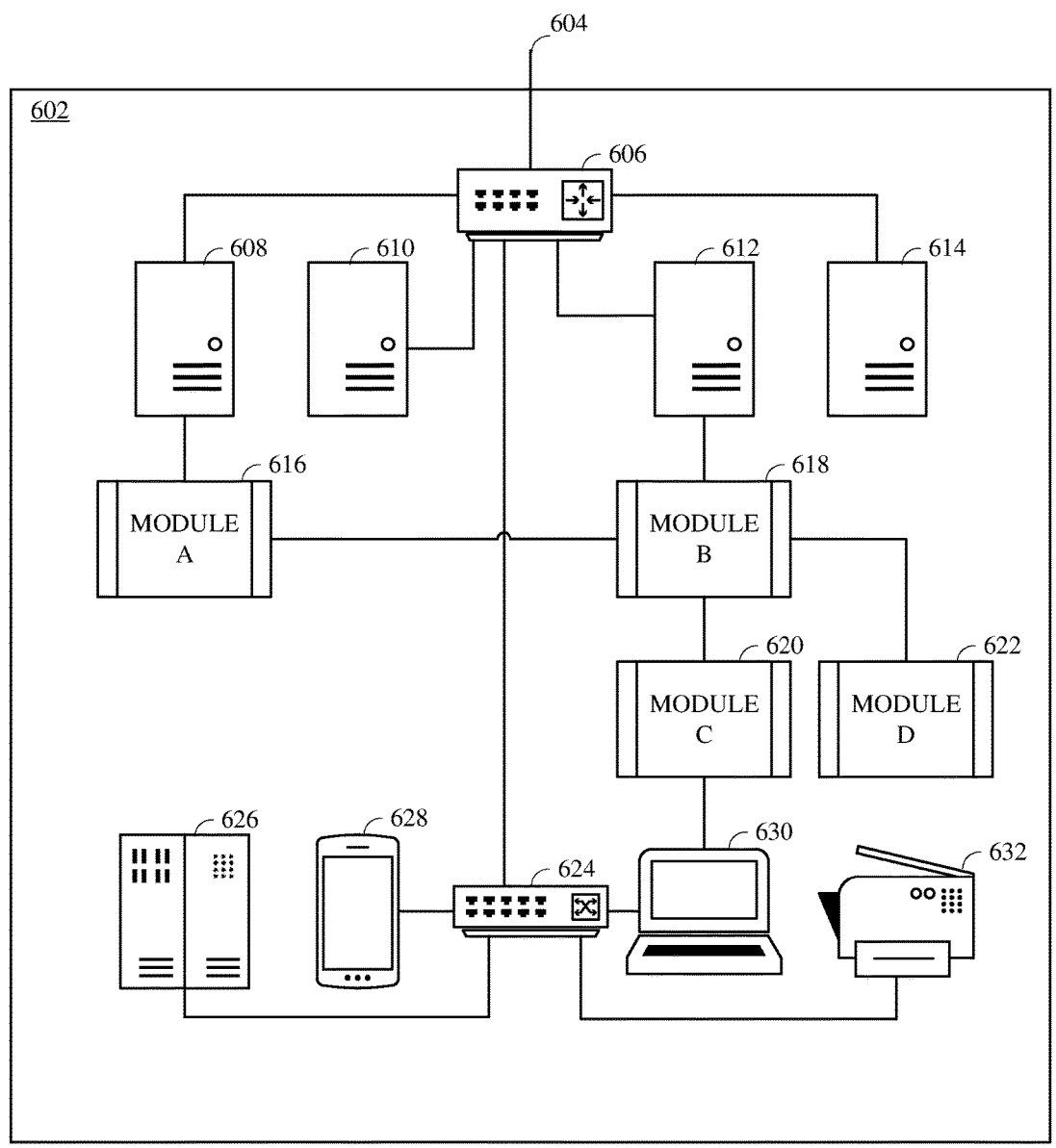
FIG. 6 is diagram of components of an exemplary network-connected computing infrastructure.

FIG. 6 is diagram of components of an exemplary network-connected computing infrastructure 602. The infrastructure 602 can be connected or extended to other infrastructure by way of network communication links such as a link 604. External communication can be handled by, for example, a network device such as a router/switch 606. The router/switch 606 can connect, for example, to servers 608, 610, 612, 614. The links between the router/switch 606 and the servers 608-614 can represent physical network connections between devices, such as wired or wireless connections. The servers 608-614 may have similar or different network configurations. For example, the server 608 might be configured as part of a DMZ and can be exposed to the external network link 604 and the server 612 might be configured to permit port forwarding on port 80 from the external link 604. The server 608 can include an installed and/or executing software module A 616. The module A 616 can, for example, provide network services to devices within the infrastructure 602 or other infrastructure or extended infrastructure accessible by the link 604. The module A 616 could for example, be a web server, mail server, ftp server, voip server, proxy server, VPN server, or the like.

Server 612 can, for example, have installed or have executing on it software modules B 618, C 620, and D 622. In one possible implementation, the module B 618 is a web server, the modules C 620 and D 622 are web applications operating using the module B 618, and the module A 616 is a VPN server. In such an implementation, the links shown between the module A 616, the module B 618, the module C 620, and the module D 622 are logical links, e.g., they do not represent physical network connections. For example, the link between the module A 616 and the module B 618 can represent the ability for VPN network users to access a web server (e.g., the module B 618) in a secure manner from the link 604. For example, the link between the module B 618 and the modules C 620 and D 622 can represent the ability for the web server (the module B 618) to operate web applications (e.g., the modules C 620, D 622).

The router/switch 606 can connect to another network device such as a router/switch 624 which can then connect to other network-connected devices such as a mainframe device 626, a mobile device 628, a laptop 630, and a printer 632. Links between the router/switch 606, the router/switch 624, and the devices 626-632 can represent physical network connections between devices, such as wired or wireless connections. Also shown is a link between the laptop 630 and the module C 620 which can represent a logical relationship such as an open network connection or session between the laptop 630 and a web application (e.g., the module C 620).

The nodes and links shown in the network-connected computing infrastructure 602 can be reflected in data stored in a CMDB including CIs. For example, the devices and modules depicted in the network-connected computing infrastructure 602 can have associated CIs in the CMDB. However, some devices may be omitted from the CMDB such as mobile device 628, such as because of an intentional configuration choice or because the mobile device 628 has not yet been discovered. As a further example, the links shown in the network-connected computing infrastructure 602 can be reflected as CI relationships within the CMDB. However, some links may be omitted. For example, the logical link between the module C 620 and the laptop 630 can be omitted because it is a transient usage of the module C 620 by the laptop 630 and thus does not rise to the level of a CI relationship.

The depiction of the devices and links within network-connected computing infrastructure 602 is but one example of a network-connected computing infrastructure. Other network-connected computing infrastructures can be used with the present disclosure, including such infrastructures that can have tens or hundreds of thousands of devices that include categories or types of devices not described here and software modules and links not described here. For example, network-connecting computing infrastructures can include logical business services representative of functionality within a network-connected computing infrastructure.

Figure 7:
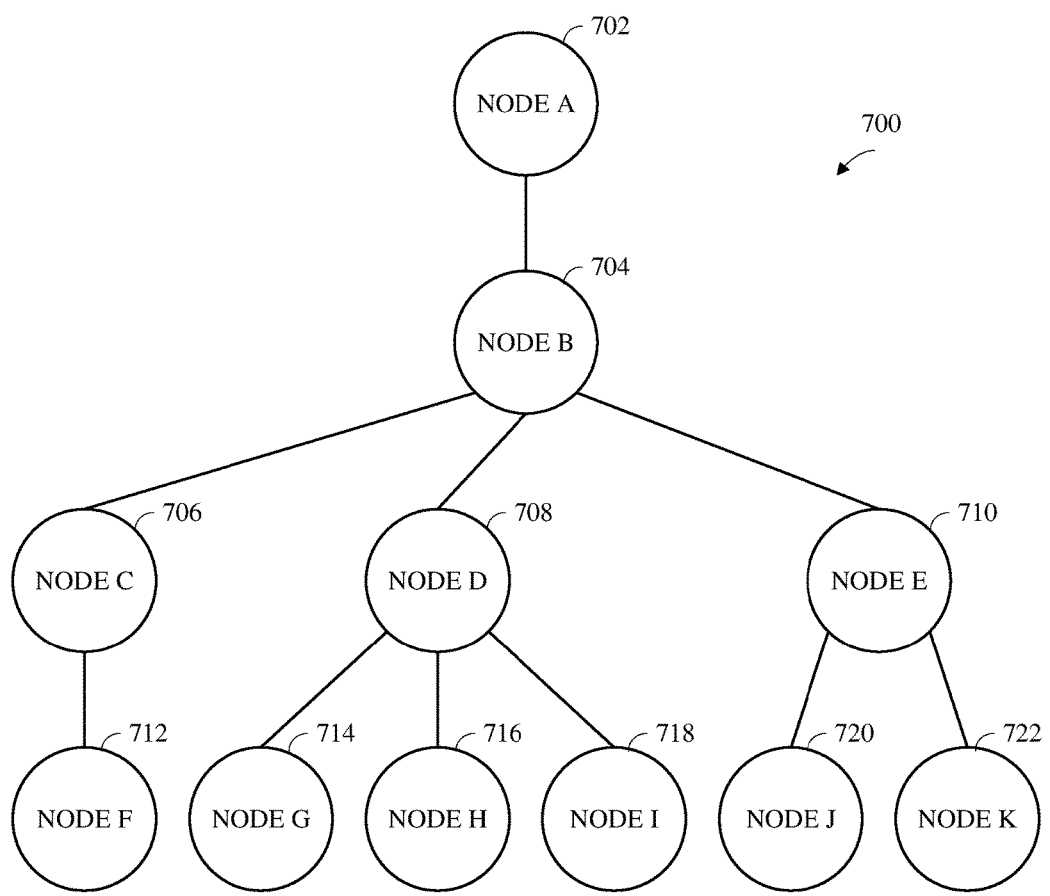
FIG. 7 is an exemplary graph of nodes.

FIG. 7 is an exemplary graph 700 of nodes 702-722. The graph 700 includes the nodes 702-722 and links between the nodes depicted as lines between the nodes 702-722. The graph 700 can be representative of a network-connected computing infrastructure, such as the infrastructure 602 of FIG. 6. For example, and with respect to the components shown in FIG. 6, the node A 702 can be representative of the router/switch 606, the node B 704 can be representative of the router/switch 624, and the nodes C-E 706-710 can be representative of the mainframe device 626, the laptop 630, and the printer 632, respectively. In this example, mobile device 628 may be omitted because it is not included in the CMDB as a CI. The remaining nodes F-K 712-722 can be representative of software modules present on the devices 626, 630, and 632 (not shown in FIG. 6). Alternatively, some or all of the nodes F-K 712-722 can be representative of relationships with other devices or modules. For example, the node D 708 may have a link to the node G 714 which is representative of the module C 620.

Figure 8A:
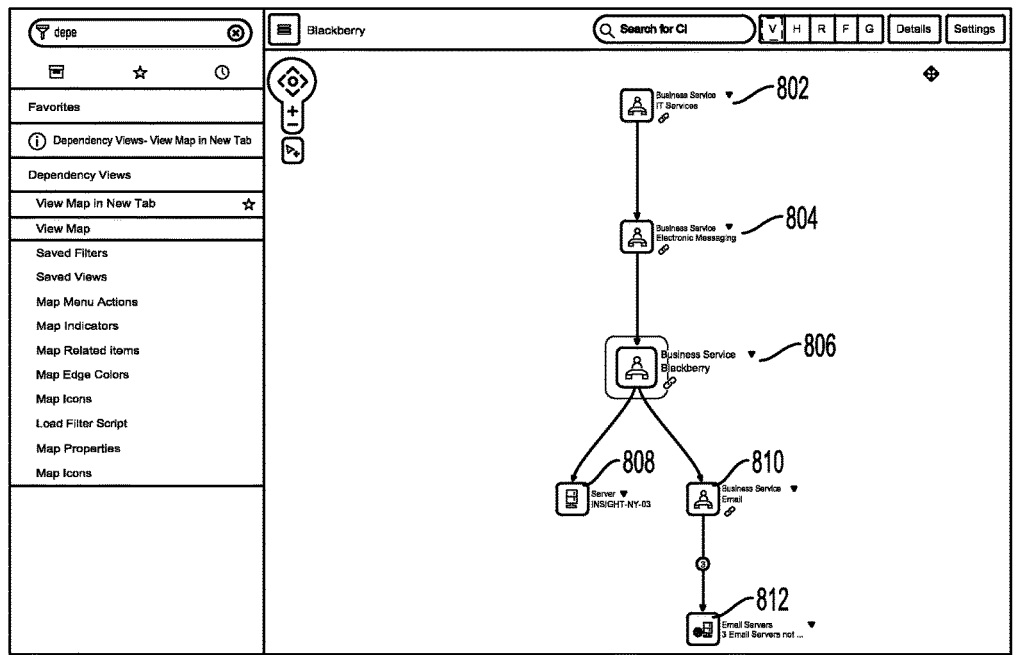
FIG. 8A is an implementation of a user interface displaying a graph of components in an exemplary network-connected computing infrastructure.

FIG. 8A is an implementation of a user interface displaying a graph of components in an exemplary network-connected computing infrastructure. Depicted in FIG. 8A is a user interface 800 including four business service nodes 802-806, 810, a group node representing three e-mail servers 812, and a standalone server 808. Links are shown connecting the business service nodes, the "Blackberry" business service 806 and the standalone server 808, and the "email" business service 810 and the e-mail servers 812. The "Blackberry" business service 806 is depicted as being the selected node in the graph. In some implementations, the graph depicted in the user interface 800 is a graph generated using default data or settings (e.g., before custom graph generation).

Figure 8B:
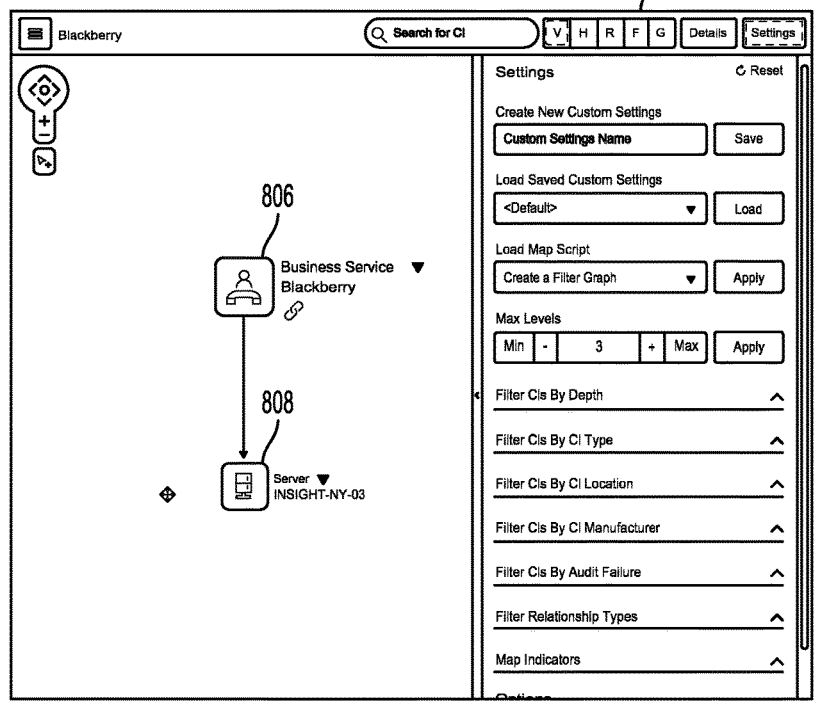
FIG. 8B is an implementation of a user interface displaying a custom graph of components in an exemplary network-connected computing infrastructure.

FIG. 8B is an implementation of a user interface displaying a custom graph of components in an exemplary network-connected computing infrastructure. Depicted in FIG. 8B is a user interface 814 including the results of generating a custom graph from the graph of FIG. 8A using implementations of this disclosure. In the example shown, the selected (root) node 806 is now at the root of the custom graph. In this example, the graph is limited to devices dedicated to the "Blackberry" business service 806. For that reason, the "email" business service 810 was not selected as a child node and the "email" business service 810 and the e-mail server 812 are omitted from the custom graph.

Figure 9:
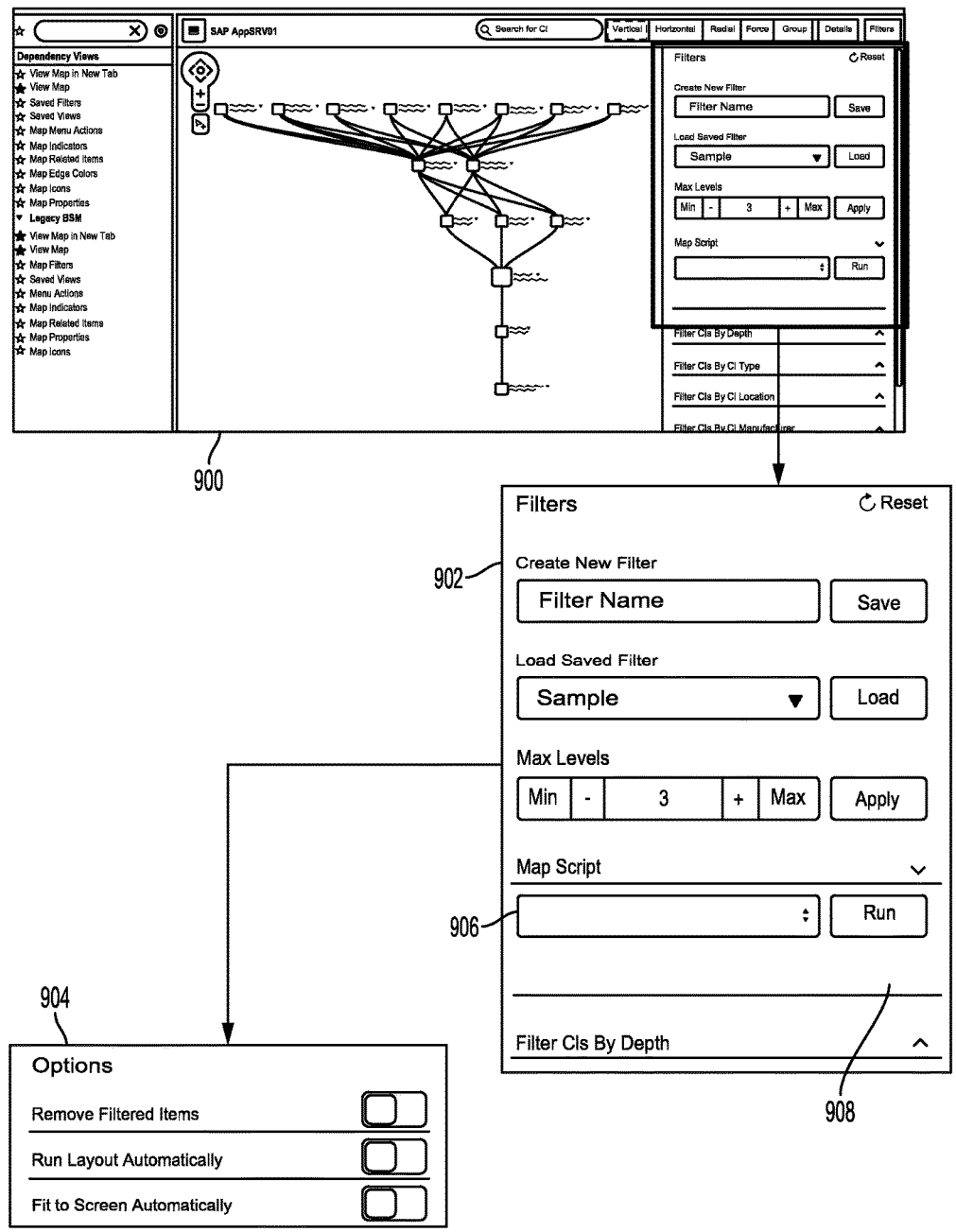
FIG. 9 is an implementation of user interface elements usable for applying plugins to generate a custom graph.

FIG. 9 is an implementation of user interface elements usable for applying plugins to generate a custom graph. Depicted in FIG. 9 is a user interface 900 including user interface elements 902-908 usable for generating a custom graph. The user interface 900 can be transmitted to a client device to generate the custom graph based on input received using the user interface elements 902-908. A set of the user interface elements 902 includes a map script selection user interface element 906 which provides the ability for a user to select a plugin to be applied to a graph displayed in the user interface 900 to generate a custom graph. For example, once a plugin is selected, the run button user interface element 908 can be used to execute the custom graph generation process which includes invocation of the plugin selected in the user interface element 906. The user interface 900 can further include, as shown in the options user interface element 904, an option to "run layout automatically" which permits the application of the custom graph generation process upon selection of a plugin without requiring use of the user interface element 908. The user interface 900 can include the ability to save a selected plugin into a user preference. For example, the user preference can be used to run the saved plugin automatically when the user interface 900 is loaded by the user at a later time. In some implementations, the listing of plugins available in the user interface elements 906 can be populated using an API function which can query a table (e.g., ngbsm_scripts, described later) for plugins that are active or otherwise available.

Figure 10:
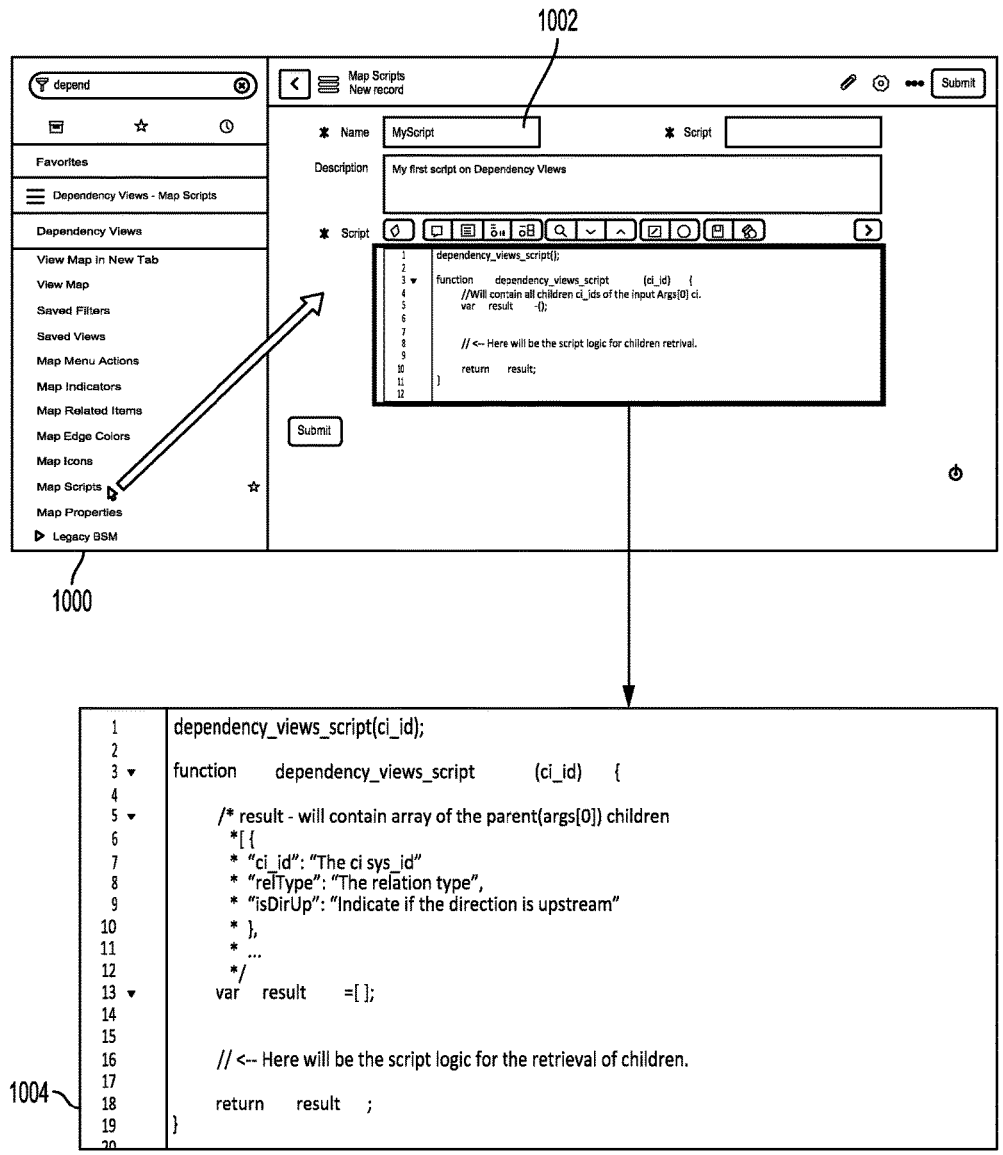
FIG. 10 is an implementation of user interface elements usable to generate plugins for custom graph generation.

FIG. 10 is an implementation of user interface elements usable to generate plugins for custom graph generation. Depicted in FIG. 10 is a user interface 1000 for implementing a plugin including a user interface element 1002 for plugin name and a script user interface element 1004 for implementing the plugin. The script user interface element 1004 can include a template for creating a plugin including an indication of an input provided to the plugin and an output that the plugin is expected to produce. The script user interface element 1004 can include other features such as automatic completion of objects and variables available to the plugin when script is entered by a user. The user interface 1000 can be transmitted to a client device. The client device can be used to generate the plugin, such as using the script user interface element 1004.

For example, the plugin can be implemented using JavaScript. The script can access functionality made available by the service provider via, for example, platform-based software. The input and output to the plugin script can be simplified to include as input a parent node, and as output child nodes of the parent node and associated relations determined by the plugin. For example, the plugin script may not be required to traverse or recursively process a graph or to perform other tasks necessary for a traversal or recursion.

In some implementations, plugins can be stored in a database table, such as by using a table schema such as described below in Table 2. For example, a plugin can be stored in a database table based on a script received from a client device to which the user interface 1000 is transmitted. Access to modify or create plugins can be restricted, such as to users having an administrator type role.

TABLE 2

Exemplary table schema for storing plugins.

```
CREATE TABLE 'ngbsm_scripts' (
    'name' varchar(40) DEFAULT NULL,
    'description' mediumtext,
    'script_plain' mediumtext,
    'active' tinyint(1) DEFAULT NULL,
    'sys_id' char(32) NOR NULL DEFAULT ' ',
    'sys_updated_by' varchar(40) DEFAULT NULL,
    'sys_updated_on' datetime DEFAUL NULL,
    'sys_created_by' varchar(40) DEFAULT NULL,
    'sys_created_on' datetime DEFAUL NULL,
    'sys_mod_count' int(11) DEFAULT NULL,
    PRIMARY KEY ('sys_id')
) ENGINE=InnoDB DEFAULT CHARSET=utf8;
```

Certain exemplary implementations of plugins will now be described.

In some implementations, a plugin template can be provided to a user, such as when a new plugin is created such as by using the user interface 1000 depicted in FIG. 10. An exemplary implementation of such a plugin template is shown in Computer Program Listing 1.

In some implementations, an "application to network devices" plugin can be used to generate a custom graph including network devices in network paths leading to and from a selected node/CI. For example, an indication of a selected node received from a client device can indicate that the selected node is a CI representing an application. The plugin can include instructions to generate child nodes representative of network devices connected to the selected node. An exemplary implementation of such a plugin is shown in Computer Program Listing 2.

In some implementations, a "network device to applications" plugin can be used to generate a custom graph which includes applicative CIs which are the target or source of network paths containing a selected node/CI. For example, an indication of a selected node received from a client device can indicate that the selected node is a CI representing a network device. In this context, an applicative CI is, for example a software module and not a network device. In addition to applicative CIs, the plugin can return the host devices of the applicative CIs and if an applicative CI is a member of a group, can return the parent member or group CI for that applicative CI. For example, the plugin may include instructions to generate a child node representative of a host device on which an application represented by a previously generated child node executes. An exemplary implementation of such a plugin is shown in Computer Program Listing 3.

In some implementations, a "physical network connections" plugin can be used to generate a custom graph which includes physically connected devices to a selected node/CI. For example, an indication of a selected node received from a client device can indicate that the selected node is a CI representing a network device. The plugin can include instructions to generate child nodes representative of other network devices that are physically connected to the network device. An exemplary implementation of such a plugin is shown in Computer Program Listing 4.

In the exemplary implementations of the above plugins, helper functions can be used. In an implementation, these helper functions are implemented in Java and are made accessible to the JavaScript plugin using an integration between the JavaScript interpreter and a Java Virtual Machine in which the Java helper functions are executed. Exemplary implementations of these helper functions are included in Computer Program Listing 5.

In some implementations, plugins can be implemented using techniques other than JavaScript or the like. For example, a plugin can be implemented using a domain-specific language, such as one designed for the identification of nodes to be included in a graph. A domain-specific language can permit creation of a plugin to be simpler, e.g., using less statements or statements more specific to the identification of nodes and metadata about the nodes (e.g., links, link direction, labels, and the like). In some implementations, a visual programming technique can be used, such as a graphical workflow designer or other visual programming interface, such by using Blockly or the like.

An implementation includes means for receiving an indication of a selected node in a graph representative of a network-connected computing infrastructure from a client device; means for invoking a plugin by providing the selected node to the plugin, wherein an output of the plugin includes child nodes generated by the plugin; means for iteratively processing the child nodes generated by invoking the plugin and subsequent invocations of the plugin to generate a custom graph, wherein the child nodes generated by the plugin are provided to the plugin in subsequent invocations; and means for transmitting the generated custom graph to the client device for display.

All or a portion of the implementations of the systems and techniques described herein can be implemented using a general-purpose computer/processor with a computer program that, when executed, carries out any of the respective techniques, algorithms, or instructions described herein. In addition, or alternatively, for example, a special-purpose computer/processor can be utilized, which can include specialized hardware for carrying out any of the techniques, algorithms, or instructions described herein.

The implementations of computing devices as described herein (and the algorithms, techniques, instructions, etc., stored thereon or executed thereby) can be realized in hardware, software, or a combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination.

For example, one or more computing devices can include an ASIC or programmable logic array (e.g., a field-programmable gate array (FPGA)) configured as a special-purpose processor to perform one or more of the operations described or claimed herein. An example FPGA can include a collection of logic blocks and RAM blocks that can be individually configured or configurably interconnected in order to cause the FPGA to perform certain functions. Certain FPGAs can contain other general- or special-purpose blocks as well. An example FPGA can be programmed based on a hardware definition language (HDL) design, such as VHSIC Hardware Description Language or Verilog.

The implementations disclosed herein can be described in terms of functional block components and various processing operations. Such functional block components can be realized by any number of hardware or software components that perform the specified functions. For example, the described implementations can employ various integrated circuit components (e.g., memory elements, processing elements, logic elements, look-up tables, and the like), which can carry out a variety of functions under the control of one or more microprocessors or other control devices. Similarly, where the elements of the described implementations are implemented using software programming or software elements, the systems and techniques can be implemented with any programming or scripting language, such as C, C++, Java, assembler, or the like, with the various algorithms being implemented with a combination of data structures, objects, processes, routines, or other programming elements. Functional aspects can be implemented in algorithms that execute on one or more processors. Furthermore, the implementations of the systems and techniques could employ any number of conventional techniques for electronics configuration, signal processing or control, data processing, and the like. The words "mechanism" and "element" are used broadly and are not limited to mechanical or physical implementations, but can include software routines in conjunction with processors, etc.

Likewise, the terms "module" or "monitor" as used herein and in the figures may be understood as corresponding to a functional unit implemented using software, hardware (e.g., an ASIC), or a combination of software and hardware. In certain contexts, such modules or monitors may be understood to be a processor-implemented software module or software-implemented monitor that is part of or callable by an executable program, which may itself be wholly or partly composed of such linked modules or monitors.

Implementations or portions of implementations of the above disclosure can take the form of a computer program product accessible from, for example, a computer-usable or computer-readable medium. A computer-usable or computer-readable medium can be any device that can, for example, tangibly contain, store, communicate, or transport a program or data structure for use by or in connection with any processor. The medium can be, for example, an electronic, magnetic, optical, electromagnetic, or semiconductor device. Other suitable mediums are also available. Such computer-usable or computer-readable media can be referred to as non-transitory memory or media, and can include RAM or other volatile memory or storage devices that can change over time. A memory of an apparatus described herein, unless otherwise specified, does not have to be physically contained by the apparatus, but is one that can be accessed remotely by the apparatus, and does not have to be contiguous with other memory that might be physically contained by the apparatus.

The word "example" is used herein to mean serving as an example, instance, or illustration. Any aspect or design described herein as "example" is not necessarily to be construed as preferred or advantageous over other aspects or designs. Rather, the use of the word "example" is intended to present concepts in a concrete fashion. The use of any and all examples, or language suggesting that an example is being described (e.g., "such as"), provided herein is intended merely to better illuminate the systems and techniques and does not pose a limitation on the scope of the systems and techniques unless otherwise claimed. As used in this disclosure, the term "or" is intended to mean an inclusive "or" rather than an exclusive "or." That is, unless specified otherwise or clearly indicated otherwise by the context, the statement "X includes A or B" is intended to mean any of the natural inclusive permutations thereof. For example, if X includes A; X includes B; or X includes both A and B, then "X includes A or B" is satisfied under any of the foregoing instances. In addition, the articles "a" and "an" as used in this disclosure and the appended claims should generally be construed to mean "one or more," unless specified otherwise or clearly indicated by the context to be directed to a singular form. Moreover, use of the term "an implementation" or the term "one implementation" throughout this disclosure is not intended to mean the same implementation unless described as such.

The particular implementations shown and described herein are illustrative examples of the systems and techniques and are not intended to otherwise limit the scope of the systems and techniques in any way. For the sake of brevity, conventional electronics, control systems, software development, and other functional aspects of the systems (and components of the individual operating components of the systems) cannot be described in detail. Furthermore, the connecting lines, or connectors, shown in the various figures presented are intended to represent example functional relationships or physical or logical couplings between the various elements. Many alternative or additional functional relationships, physical connections, or logical connections can be present in a practical device. Moreover, no item or component is essential to the practice of the systems and techniques unless the element is specifically described as "essential" or "critical".

The use of the terms "including," "comprising," "having," or variations thereof herein is meant to encompass the items listed thereafter and equivalents thereof as well as additional items. Unless specified or limited otherwise, the terms "mounted," "connected," "supported," "coupled," or variations thereof are used broadly and encompass both direct and indirect mountings, connections, supports, and couplings. Further, "connected" and "coupled" are not restricted to physical or mechanical connections or couplings.

Unless otherwise indicated herein, the recitation of ranges of values herein is intended merely to serve as a shorthand alternative to referring individually to respective separate values falling within the range, and respective separate values are incorporated into the specification as if individually recited herein. Finally, the operations of all techniques described herein are performable in any suitable order unless clearly indicated otherwise by the context.

All references, including publications, patent applications, and patents, cited herein are hereby incorporated by reference to the same extent as if respective references were individually and specifically indicated as being incorporated by reference and were set forth in its entirety herein.

The above-described implementations have been described in order to facilitate easy understanding of the present systems and techniques, and such descriptions of such implementations do not limit the present systems and techniques. To the contrary, the present systems and techniques are intended to cover various modifications and equivalent arrangements included within the scope of the appended claims, which scope is to be accorded the broadest interpretation as is permitted by law so as to encompass all such modifications and equivalent arrangements.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ," it is intended that such elements are to be interpreted under 35 U.S.C. 112(f). However, for any claims containing elements designated in any other manner, it is intended that such elements are not to be interpreted under 35 U.S.C. 112(f).

---

Computer Program Listing 1.
Implementation of a plugin template.

```
/***** IN ******
 * var dv_level =         "System      - Unmodifiable input
parameter which indicate the current depth level ";
 * var dv_ci_id=          "System      - The ci SYS_ID of the
parent node as appear in the DB";
 * var dv_params=         "System      - Container for custom sticky
parameters to be passed to this script on every recursion [default-
empty]";
 */
dependency_views_script( );
function dependency_views_script( ) {
        /***** OUT ****** result - will contain array of the
parent(args[0]) children
        *[ {
        *    "dv_ci_id":          "Mandatory     - The ci SYS_ID of
the child as appear in the DB",
        *    "dv_rel_id":         "Optional - The relation ID, a
unique identifier for this relation only [default-sys generated]",
        *    "dv_rel_type":       "Optional - The ID of the relation
type as in the DB [default-1a9cb166f1571100a92eb60da2bce5c5]",
        *    "dv_rel_type_label": "Optional - The label of the
relation, overwrites dv_rel_type label [default- dv_rel_type
label]",
        *    "dv_downstream":     "Optional - Indicate   if   the
direction is downstream or upstream [default-true]",
        *    "dv_params":         "Optional - Container for sticky
parameters to be passed to this script on every recursion [default-
empty]",
        *    "dv_messages":       "Optional -  Container     for
notifications to be send to the client    [default-empty]"
        * }, ... ] */
        var result = [ ];
        // <-- Here will be the script logic for the retrieval of
the children.
        result.push({
               "dv_ci_id":         "27d32778c0a8000b00db970eeaa60f16",
//Represent the 'Email' CI
               "dv_rel_id":        "27eb80f3c0a8000b00587d37871ce04e",
//Represent the link between Blackberry & Email
               "dv_rel_type":      "1a9cb166f1571100a92eb60da2bce5c5",
//which represent the 'Depends on::Used by'
               "dv_downsream": "true", //The link is downstream
               "dv_params": { "test": "1234" }, //Pass a custom parameter
to be used in the next call of this script
               "dv_messages":      { "type":"info", "msg":"Testing Info
Notification"} //Pass a notification to be displayed on the client
[error,info]
        });
        return result;
}
```

---

Computer Program Listing 2.
Implementation of an "application to network devices" plugin.

```
getNetworkDevicesForApplication( );
function getNetworkDevicesForApplication( ){
        var result =[ ];
        // Validate that the selected ci is an application
        if(dv_level == 0){
               var rec = new GlideRecord('cmdb');
               if(rec.get(dv_ci_id)){
                       if(!rec.instanceOf('cmdb_ci_appl') &&
```

---

-continued

Computer Program Listing 2.
Implementation of an "application to network devices" plugin.

```
!rec.instanceOf('cmdb_ci_lb')){
                       result.push({
                               "dv_ci_id": dv_ci_id,
                               "dv_messages":    { "type":"error",
"msg":"The selected ci is not an application"}
                       });
                       return result;
               }
        }
}
var npm = new SNC.NetworkPathManager( );
// Get a map between the network device id to the relation
properties of the network devices in paths leading to/from the
given CI
var            ciIdToRelProperties =
npm.getNetworkDevicesForApplication(dv_ci_id);
for(var ciId in ciIdToRelProperties){
        var propertiesMap = ciIdToRelProperties[ciId];
        result.push({
               "dv_ci_id": ciId,
               "dv_downstream":
propertiesMap["relation_direction"],
               "dv_rel_type": propertiesMap["relation_type"]
        });
}
return result;
}
```

---

Computer Program Listing 3.
Implementation of a "network device to applications" plugin.

```
getSourcesAndTargetsForNetworkDevice( );
function getSourcesAndTargetsForNetworkDevice( ){
        var result = [ ];
        // Validate that the selected ci is a network device
        if(dv_level == 0){
               var rec = new GlideRecord('cmdb');
               if(rec.get(dv_ci_id)){
                       if(!rec.instanceOf('cmdb_ci_netgear')){
                               result.push({
                                      "dv_ci_id": dv_ci_id,
                                      "dv_messages":    { "type":"error",
"msg":"The selected ci is not a network device"}
                               });
                               return result;
                       }
               }
        }
        var npm = new SNC.NetworkPathManager( );
        // Return a map between the ci id to the relation properties
of the applicative CIs which are target or source of network paths
containing the given network device
        var            ciIdToRelProperties =
npm.getSourcesAndTargetsForNetworkDevice(dv_ci_id);
        for(var ciId in ciIdToRelProperties){
               var propertiesMap = ciIdToRelProperties[ciId];
               result.push({
                       "dv_ci_id": ciId,
                       "dv_downstream":
propertiesMap["relation_direction"],
                       "dv_rel_type": propertiesMap["relation_type"]
               });
        }
        return result;
}
```

Computer Program Listing 4.
Implementation of a "physical network connections" plugin.

```
getNeighborsForNetworkDevice( );
function getNeighborsForNetworkDevice( ){
var result =[ ];
var npm = new SNC.NetworkPathManager( );
var ciIdToRelProperties = npm.getNetworkNeighbors(dv_ci_id);
for(var ciId in ciIdToRelProperties){
    var propertiesMap = ciIdToRelProperties[ciId];
    result.push({
        "dv_ci_id": ciId,
        "dv_downstream": propertiesMap["relation_direction"],
        "dv_rel_type": propertiesMap["relation_type"]
    });
}
return result;
}
```

Computer Program Listing 5.
Implementation of functions used in exemplary plugins.

```
public class NetworkPathManager extends ScriptableObject
implements Service, ISAConstants {
    private static final long serialVersionUID = 1L;
    private String fError;
    private INetworkPathHandler fNetworkPathHandler = new
NetworkPathHandler( );
    private NetworkPathCalculator fNetworkPathCalculator = new
NetworkPathCalculator( );
    private NetworkPathAssocHandler fNetworkPathAssocHandler =
new NetworkPathAssocHandler( );
    @Override
    public void setError(String error) {
        fError = error;
    }
    /**
     * Submit new trace route tasks. Pick entries from
sa_network_paths marked as waiting for discovery and submit the
     * tasks. In addition reset hanging tasks
     *
     * @param limit
     *            max tasks to submit on each cycle
     * @return
     */
    public boolean jsFunction_submitTraceRouteTasks(int limit) {
        try {
            fNetworkPathHandler.submitTraceRouteTasks(limit);
            fNetworkPathHandler.resetHangingTraceRouteTasks( );
            return true;
        } catch (Throwable t) {
            return ExceptionHandler.handleException(t, this);
        }
    }
    /**
     * Create physical connections from a device once it is
discovered by horizontal discovery
     *
     * @param deviceId
     * @return
     */
    public boolean jsFunction_createPhysicalConnections(String
deviceId) {
        try {
fNetworkPathHandler.createPhyiscalConnections(deviceId);
            return true;
        } catch (Throwable t) {
            return ExceptionHandler.handleException(t, this);
        }
    }
    /**
     * Calculate network path. This function is for debugging
purposes and is not called in production flow. It prints
```

Computer Program Listing 5.
Implementation of functions used in exemplary plugins.

```
     * to log the calculation results and can save the results to
the DB
     *
     * @param hostId
     *            the source host
     * @param targetIp
     *            the target IP of the path
     * @param traceRoute
     *            trace route result from source host to target IP
     * @param savePath
     *            should save the path to the DB
     * @return true if calculation succeeded
     */
    public boolean jsFunction_calculateNetworkPath(String hostId,
String targetIp, String traceRoute, boolean savePath) {
        try {
            StringMap infraPathAttrs = new StringMap( );
            infraPathAttrs.put(SaNetworkPathsModel.HOST_ID,
hostId);
            infraPathAttrs.put(SaNetworkPathsModel.TARGET_IP,
targetIp);
            infraPathAttrs.put(SaNetworkPathsModel.
LAYER_3_PATH, traceRoute);
            InfraPathGraph        graph        =
fNetworkPathCalculator.calculate(infraPathAttrs);
            for (InfraPathNode node : graph.getNodes( )) {
                Log.debug("Node ID: " + node.getId( ) + " Name: "
+ node.getName( ) + " Layer: " + node.getLayer( )
                        + " Host: " + node.getHost( ) + " Type: "
+ node.getType( ));
            }
            if (savePath) {
                // Save the path elements
fNetworkPathAssocHandler.createOrUpdate(infraPathAttrs, graph);
            }
            return true;
        } catch (Throwable t) {
            return ExceptionHandler.handleException(t, this);
        }
    }
    @Override
    public String getClassName( ) {
        return "NetworkPathManager";
    }
    /**
     * Return a NativeObject that represents a map between the ci
id to the relation properties of the of applicative
     * CIs which are target or source of network paths containing
the given network device
     *
     * @param networkDeviceId
     * @return
     */
    public                                          NativeObject
jsFunction_getSourcesAndTargetsForNetworkDevice(String
networkDeviceId) {
        Map<String, StringMap>  ciIdToRelProperties  =  new
HashMap<String, StringMap>( );
        NativeObject nativeObj = new NativeObject( );
        try {
            NetworkToAppScript    networkToAppScript    =    new
NetworkToAppScript( );
            ciIdToRelProperties                              =
networkToAppScript.getSourcesAndTargetsForNetworkDevice
(networkDeviceId);
            addPropertiesToNativeObject(nativeObj,
ciIdToRelProperties);
            return nativeObj;
        } catch (Throwable t) {
            ExceptionHandler.handleException(t, this);
            return nativeObj;
        }
    }
    /**
```

-continued

Computer Program Listing 5.
Implementation of functions used in exemplary plugins.

```
    * Return a NativeObject that represents a map between the ci
id to the relation properties of the network devices
    * in network paths leading to/from the given ci
    *
    * @param ciId
    * @return
    */
    public                                          NativeObject
jsFunction_getNetworkDevicesForApplication(String ciId) {
        Map<String, StringMap> ciIdToRelProperties = new
HashMap<String, StringMap>( );
        NativeObject nativeObj = new NativeObject( );
        try {
            AppToNetworkScript    appToNetworkScript    =    new
AppToNetworkScript( );
            ciIdToRelProperties                                 =
appToNetworkScript.getNetworkDevicesForApplication(ciId);
            addPropertiesToNativeObject(nativeObj,
ciIdToRelProperties);
            return nativeObj;
        } catch (Throwable t) {
            ExceptionHandler.handleException(t, this);
            return nativeObj;
        }
    }
    public   NativeObject   jsFunction_getNetworkNeighbors(String
ciId) {
        Map<String, StringMap> ciIdToRelProperties = new
HashMap<String, StringMap>( );
        NativeObject nativeObj = new NativeObject( );
        try {
            NetNeighborFinder      neighborFinder      =      new
NetNeighborFinder( );
            ciIdToRelProperties                                 =
neighborFinder.getNetworkNeighbors(ciId);
            addPropertiesToNativeObject(nativeObj,
ciIdToRelProperties);
            return nativeObj;
        } catch (Throwable t) {
            ExceptionHandler.handleException(t, this);
            return nativeObj;
        }
    }
    private    void    addPropertiesToNativeObject(NativeObject
nativeObj, Map<String, StringMap> ciIdToRelProperties) {
        for     (Entry<String,     StringMap>     entry      :
ciIdToRelProperties.entrySet( )) {
            NativeObject properties = new NativeObject( );
properties.defineProperty(NetworkToAppScript.RELATION_TYPE,
entry.getValue( ).get(NetworkToAppScript.RELATION_TYPE),
NativeObject.READONLY);
            properties.defineProperty(NetworkToAppScript.
RELATION_DIRECTION, entry.getValue( ).get(NetworkToAppScript.
RELATION_DIRECTION), NativeObject.READONLY);
            nativeObj.defineProperty(entry.getKey( ), properties,
NativeObject.READONLY);
        }
    }
}
```

What is claimed is:

1. A system that selectively generates a custom graph of nodes from a selected node in a graph representative of a network-connected computing infrastructure, the system comprising:
 a processor, and
 a memory, wherein the memory includes instructions executable by the processor to:
  receive an indication of the selected node from a client device;
  execute a plugin against the selected node to generate a set of child nodes associated with the selected node;
  iteratively process each child node of the set of child nodes and any additional child nodes automatically in response to generating each respective child node, wherein iteratively processing each child node and any additional child nodes comprises executing the plugin against each child node of the set of child nodes to generate the additional child nodes;
  generate the custom graph based on the selected node, the set of child nodes, and the additional child nodes generated by the plugin; and
  transmit the generated custom graph to the client device for display.

2. The system of claim 1, wherein the selected node is representative of a configuration item for an application and the plugin includes instructions to generate child nodes representative of network devices connected to the selected node.

3. The system of claim 1, wherein the selected node is representative of a configuration item for a network device and the plugin includes instructions to generate child nodes representative of applications which are a target or a source of network paths including the configuration item.

4. The system of claim 3, wherein the plugin includes instructions to generate a child node representative of a host device on which an application represented by a previously generated child node executes.

5. The system of claim 1, wherein the selected node is representative of a configuration item for a network device and the plugin includes instructions to generate child nodes representative of other network devices physically connected to the network device.

6. The system of claim 1, wherein the plugin is implemented using a domain specific language.

7. The system of claim 1, comprising instructions executable by the processor to:
 generate a user interface including a graph of components, wherein the user interface includes respective user interface elements permitting selection of a node from the graph of components and the plugin from a list of plugins;
 transmit the user interface to the client device; and
 receive an indication of the plugin from the client device.

8. The system of claim 7, comprising instructions executable by the processor to:
 generate a second user interface including a script user interface element incorporating a plugin template;
 transmit the second user interface to the client device; and
 store the plugin in a database table based on a script received from the client device and created using the second user interface.

9. The system of claim 1, comprising instructions executable by the processor to:
 perform a discovery process to collect information of at least one network-connected device in the network-connected computing infrastructure; and
 store at least one configuration item representative of the at least one network-connected device in a configuration management database,
 wherein at least one of the stored configuration items includes a relationship with at least one other configuration item,
 wherein at least one node of the custom graph is representative of the at least one configuration item.

10. The system of claim 1, comprising instructions executable by the processor to:

check an access control list for a current configuration item associated with a current child node of the child nodes against a user or a role associated with the client device.

11. The system of claim 10, wherein the instructions to check the access control list for the configuration item associated with the current child node of the child nodes include instructions to cause the generated custom graph to include a placeholder for the current child node responsive to a determination that the user or the role does not have permission to access the configuration item.

12. The system of claim 10, wherein the instructions to check the access control list for the configuration item associated with the current child node of the child nodes include instructions to cause the generated custom graph to omit the current child node responsive to a determination that the user or the role does not have permission to access the configuration item.

13. The system of claim 1, comprising instructions executable by the processor to:
responsive to a determination that a current child node of the child nodes does not meet valid graph criteria, remove the current child node from the custom graph.

14. A method to selectively generate a custom graph of nodes from a selected node in a graph representative of a network-connected computing infrastructure, the method comprising:
receiving an indication of the selected node from a client device;
executing a plugin against the selected node to generate a set of child nodes associated with the selected node;
iteratively processing each child node of the set of child nodes and any additional child nodes automatically in response to generating each respective child node, wherein iteratively processing each child node and any additional child nodes comprises executing the plugin against each child node of the set of child nodes to generate the additional child nodes;
generating the custom graph based on the selected node, the set of child nodes, and the additional child nodes generated by the plugin; and
transmitting the generated custom graph to the client device for display.

15. The method of claim 14, comprising:
performing a discovery process to collect information of at least one network-connected device in the network-connected computing infrastructure; and
storing at least one configuration item representative of the at least one network-connected device in a configuration management database,
wherein at least one of the stored configuration items includes a relationship with at least one other configuration item,
wherein at least one node of the custom graph is representative of the at least one configuration item.

16. The method of claim 14, comprising:
checking an access control list for a current configuration item associated with a current child node of the set of child nodes or the additional child nodes against a user or a role associated with the client device.

17. The method of claim 16, wherein checking the access control list for the configuration item associated with the current child node includes replacing the current child with a placeholder in the custom graph responsive to a determination that the user or the role does not have permission to access the configuration item.

18. The method of claim 16, wherein checking the access control list for the configuration item associated with the current child node includes removing the current child node from the custom graph responsive to a determination that the user or the role does not have permission to access the configuration item.

19. The method of claim 14, comprising:
responsive to a determination that a current child node of the set of child nodes or the additional child nodes does not meet valid graph criteria, removing the current child node from the custom graph.

20. A non-transitory computer-readable storage medium comprising processor-executable routines that, when executed by a processor, facilitate a performance of operations comprising:
receiving an indication of a selected node in a graph representative of a network-connected computing infrastructure from a client device;
executing a plugin against the selected node to generate a set of child nodes associated with the selected node;
iteratively processing each child node of the set of child nodes and any additional child nodes automatically in response to generating each respective child node, wherein iteratively processing each child node and any additional child nodes comprises executing the plugin against each child node of the set of child nodes to generate the additional child nodes;
generating the custom graph based on the selected node, the set of child nodes, and the additional child nodes generated by the plugin; and
transmitting the generated custom graph to the client device for display.

* * * * *